United States Patent
Miwa et al.

(10) Patent No.: US 10,371,460 B2
(45) Date of Patent: Aug. 6, 2019

(54) HEAT STORAGE MEMBER

(71) Applicants: NGK INSULATORS, LTD., Nagoya (JP); NGK Adrec Co., Ltd., Kani-Gun (JP)

(72) Inventors: Shinichi Miwa, Nagoya (JP); Toshiharu Kinoshita, Kani-Gun (JP); Iori Himoto, Kani-Gun (JP)

(73) Assignees: NGK Insulators, Ltd., Nagoya (JP); NGK Adrec Co., Ltd., Kani-Gun (JP)

( * ) Notice: Subject to any disclaimer, the term of this patent is extended or adjusted under 35 U.S.C. 154(b) by 6 days.

(21) Appl. No.: 15/468,586

(22) Filed: Mar. 24, 2017

(65) Prior Publication Data
US 2017/0284747 A1 Oct. 5, 2017

(30) Foreign Application Priority Data
Mar. 31, 2016 (JP) ................. 2016-073486

(51) Int. Cl.
*C09K 5/16* (2006.01)
*F28D 20/00* (2006.01)

(52) U.S. Cl.
CPC .............. *F28D 20/003* (2013.01); *C09K 5/16* (2013.01)

(58) Field of Classification Search
CPC ....... F28D 2020/0004; F28D 2020/006; F28D 2020/0017; F28D 20/003
USPC .......................................................... 165/10
See application file for complete search history.

(56) References Cited

U.S. PATENT DOCUMENTS

| | | | | |
|---|---|---|---|---|
| 4,408,659 A * | 10/1983 | Hermanns | ............... | F28D 13/00 165/10 |
| 4,993,481 A * | 2/1991 | Kamimoto | .......... | C04B 38/0006 126/643 |
| 5,338,576 A | 8/1994 | Hanzawa et al. | | |
| 8,044,105 B2 * | 10/2011 | LeBaron | ............. | C04B 38/0045 501/80 |
| 2010/0099547 A1 * | 4/2010 | Fukushima | ............. | B28B 1/007 501/80 |
| 2015/0060006 A1 * | 3/2015 | Watremetz | ............. | F28D 17/02 165/10 |

FOREIGN PATENT DOCUMENTS

| | | | | |
|---|---|---|---|---|
| DE | 19800395 A1 * | 7/1999 | ............. | B01J 20/18 |
| DE | 10159652 A1 * | 9/2002 | ............... | C09K 5/00 |

(Continued)

OTHER PUBLICATIONS

European Office Action (Application No. 17163129.4) dated Jul. 20, 2018.

(Continued)

*Primary Examiner* — Allen J Flanigan
(74) *Attorney, Agent, or Firm* — Burr & Brown, PLLC

(57) ABSTRACT

A heat storage member including: a substrate containing a SiC sintered body as a principal ingredient; a coating layer disposed at least to a part of surface of the substrate; and a heat storage material disposed at least to a part of a surface of the coating layer and configured to store and radiate heat by a reversible chemical reaction with a reaction medium or a heat storage material configured to store and radiate heat by physical adsorption to a reaction medium and by physical desorption from a reaction medium. A softening point of the coating layer is a temperature at 1000° C. or less.

19 Claims, 4 Drawing Sheets

(56) References Cited

FOREIGN PATENT DOCUMENTS

| DE | 10336657 A1 * | 3/2005 | ......... F28D 20/0056 |
|---|---|---|---|
| DE | 10 2014 206 035 A1 | 10/2014 | |
| JP | 2011-027311 A1 | 2/2011 | |
| JP | 2011027311 A * | 2/2011 | |
| JP | 2013-112706 A1 | 6/2013 | |
| JP | 2015-040646 A1 | 3/2015 | |
| KR | 20140120266 A * | 10/2014 | ............. C04B 38/00 |

OTHER PUBLICATIONS

Extended European Search Report (Application No. 17163129.4) dated Aug. 1, 2017.
Lijun Gu, et a., "Template-Synthesized Porous Silicon Carbide as an Effective Host for Zeolite Catalysts," *Chemistry—A European Journal*, vol. 15, Dec. 14, 2009, pp. 13449-13455 (XP-002583187).
Suwan Mendis, et al., "The Method of Solid State Impurity Diffusion and Doping in 4H-SiC," *International Journal of Fundamental Physical Sciences*, vol. 3, No. 4, Dec. 1, 2013, pp. 75-78 (XP055392839).

\* cited by examiner

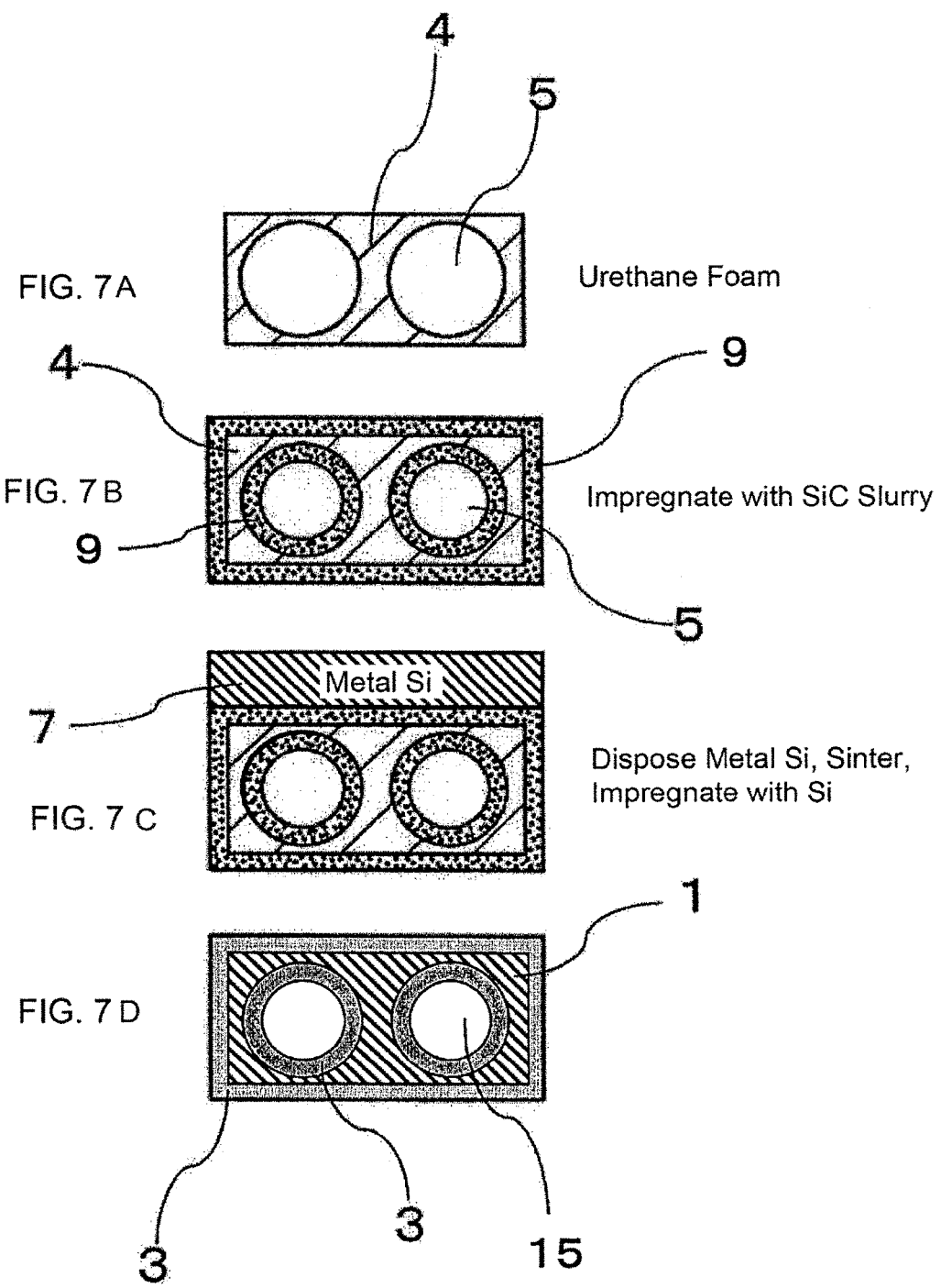

HEAT STORAGE MEMBER

The present application is an application based on JP-2016-73486 filed on Mar. 31, 2016 with Japan Patent Office, the entire contents of which are incorporated herein by reference.

BACKGROUND OF THE INVENTION

Field of the Invention

The present invention relates to a heat storage member. More specifically, the present invention relates to a heat storage member having excellent durability and capable of achieving highly-responsive heat radiation and heat absorption by a chemical reaction or physical adsorption and physical desorption between a heat storage material and a reaction medium.

Description of the Related Art

In the related art, the following technique has been proposed. That is, exhaust heat from an automobile and the like is recovered and stored by using a heat storage material, and the recovered and stored heat is utilized to activate a catalyst (a catalyst for disposing exhaust gas) when starting an engine (see Patent Documents 1 to 3). According to such a technique, the heat storage material radiates the recovered and stored heat so that it is possible to early heat the catalyst for disposing exhaust gas and to reduce a time for activating the catalyst. For example, a heat storage device disclosed in Patent Document 1 applies a chemical heat storage material, as the heat storage material, configured to store and radiate heat by a reversible chemical reaction with a reaction medium.

Herein, the chemical heat storage material is referred to as a material capable of absorbing and radiating heat by a chemical reaction. Hereinafter, "chemical heat storage" in the present disclosure is referred to as absorption and radiation of heat by a chemical reaction. The chemical heat storage using the chemical heat storage material has such an advantage that the heat can be stored at relatively high density for a long time and can be reused.

On the other hand, commonly, a potential for a heat pump utilizing physical adsorption and physical desorption of water with respect to zeolite has been shown, and research and development of such a heat pump have been promoted toward a practical application. However, in putting such a heat pump to practical use, efficiency may deteriorate due to low thermal conductivity of the zeolite. Furthermore, a potential for a heat pump utilizing physical adsorption and physical desorption of $NH_4$ with respect to magnesium chloride ($MgCl_2$) has been shown. However, efficiency may deteriorate due to low thermal conductivity of the magnesium chloride.

The heat storage device disclosed in Patent Document 1 applies calcium oxide (CaO) and the like as the heat storage material. Adding water to calcium oxide forms calcium hydroxide ($Ca(OH)_2$) and radiates heat of reaction at the same time. In other words, this reaction is called an exothermic reaction. On the other hand, adding heat to calcium hydroxide causes dehydration reaction of the calcium hydroxide and forms calcium oxide (CaO) and water ($H_2O$). This reaction is called an endothermic reaction. The aforementioned chemical reactions in calcium oxide (or in calcium hydroxide) are reversible. The endothermic reaction is used to recover the exhaust heat, and the exothermic reaction is used to radiate the heat from the chemical heat storage material.

[Patent Document 1] JP 2011-27311 A
[Patent Document 2] JP 2013-112706 A
[Patent Document 3] JP 2015-40646 A

SUMMARY OF THE INVENTION

As mentioned above, chemical heat storage has such an advantage that heat can be stored at relatively high density for a long time and can be reused. However, a chemical heat storage device using a chemical heat storage material has a problem, that is, low responsiveness of heat generation and heat absorption. It is desirable to promptly generate the heat up to a catalyst activating temperature especially when the chemical heat storage device is used to heat a catalyst at engine startup. However, it is difficult for the conventional chemical heat storage device to generate the heat promptly.

The reason for the difficulty in generating the heat promptly is low thermal conductivity of the chemical heat storage material. In other words, an exothermic reaction of the chemical heat storage material advances when the chemical heat storage material is brought into contact with a reaction medium. However, due to the low thermal conductivity of the chemical heat storage material, it takes time to radiate the generated heat. Furthermore, the generated heat is transferred to the chemical heat storage material in a non-reacting part, which deteriorates reactivity (reactivity of the exothermic reaction) of the chemical heat storage material in the non-reacting part. For example, in a case where the chemical heat storage material has a particulate shape, the exothermic reaction is saturated in the vicinity of a surface of the particulate chemical heat storage material, which makes it difficult to generate the heat sufficiently and promptly.

The reason for the aforementioned difficulty in generating the heat promptly also includes low responsiveness of the heat generation and heat absorption of the chemical heat storage material. For example, in a case of using calcium oxide as the chemical heat storage material, the exothermic reaction of the calcium oxide advances as follows. In the exothermic reaction in which water is reacted with the calcium oxide, the calcium oxide and water are quickly brought into contact on a surface of the solid calcium oxide so that the exothermic reaction advances relatively promptly. On the other hand, in an inside of the solid calcium oxide, water adhering to the surface of the calcium oxide diffuses into the inside of the calcium oxide and the diffusing water reacts with the calcium oxide. Therefore, a desired time is required to start the exothermic reaction inside the solid calcium oxide. This is presumed to be a factor of deteriorating the responsiveness of the heat generation and heat absorption of the chemical heat storage material.

In the related art, there is a proposal for a chemical heat storage member in which a chemical heat storage material is loaded onto a carrier including ceramic. In such a chemical heat storage member, repetitive heat storage and heat radiation causes the chemical heat storage material to be aggregated and the chemical heat storage material to be peeled from the carrier. Therefore, there is a demand on development of a chemical heat storage member having excellent durability and whose chemical heat storage material is hardly peeled from a carrier.

The present invention has been made in light of such problems. According to the present invention, there is provided a heat storage member capable of achieving highly-responsive heat radiation and heat absorption by a chemical reaction or physical adsorption and physical desorption between a heat storage material and a reaction medium.

According to the present invention, the following heat storage member can be provided.

[1] A heat storage member including: a substrate containing a SiC sintered body as a principal ingredient; a coating layer disposed in a surface of the substrate; and a heat storage material disposed in a surface of the coating layer and configured to store and radiate heat by a reversible chemical reaction with a reaction medium, or a heat storage material configured to store and radiate heat by physical adsorption to a reaction medium and by physical desorption from a reaction medium; wherein a softening point of the coating layer is a temperature at 1000° C. or less.

[2] The heat storage member according to [1], wherein the coating layer contains $P_2O_5$ as a principal ingredient, and a content rate of $P_2O_5$ is 20 to 45% by mass.

[3] The heat storage member according to [1], wherein the coating layer contains $B_2O_3$ as a principal ingredient, and a content rate of $B_2O_3$ is 20 to 45% by mass.

[4] The heat storage member according to [1], wherein the coating layer contains $Bi_2O_3$ as a principal ingredient, and a content rate of $Bi_2O_3$ 65 to 85% by mass.

[5] The heat storage member according to [2], wherein the coating layer contains as a secondary ingredient at least one of $Al_2O_3$, $SiO_2$, $ZnO$, $V_2O_5$, $PbO$, $SnO$, $B_2O_3$ and $Bi_2O_3$.

[6] The heat storage member according to [3], wherein the coating layer contains as a secondary ingredient at least one of $Al_2O_3$, $SiO_2$, $ZnO$, $V_2O_5$, $PbO$, $SnO$, $P_2O_5$ and $Bi_2O_3$.

[7] The heat storage member according to [4], wherein the coating layer contains as a secondary ingredient at least one of $Al_2O_3$, $SiO_2$, $ZnO$, $V_2O_5$, $PbO$, $SnO$, $P_2O_5$ and $B_2O_3$.

[8] The heat storage member according to any one of [2] to [7], wherein the coating layer contains as the secondary ingredient at least one of $CaO$, $BaO$, $SrO$ represented by $RO$ and $Li_2O$, $Na_2O$, $K_2O$ represented by $R_2O$.

[9] The heat storage member according to any one of [2] to [8], wherein the coating layer contains as the secondary ingredient at least one of $TeO_2$ and $TiO_2$.

[10] The heat storage member according to any one of [1] to [9], wherein the substrate has a content ratio of SiC ranging from 40 to 99.7% by mass, excluding an impure ingredient inevitably contained in a raw material.

[11] The heat storage member according to any one of [1] to [10], wherein the substrate is a porous material including a void, and the coating layer is disposed at least in a part of a surface of the void in the substrate.

[12] The heat storage member according to any one of [1] to [11], wherein the substrate includes a void, and has a three-dimensional network structure including a skeleton having a porosity of 1% or less, and the coating layer is disposed at least in a part of the surface of the void.

[13] The heat storage member according to [12], wherein the skeleton includes a Si—SiC sintered body, and a content ratio of metal Si in the skeleton is ranging from 5 to 60% by mass.

[14] The heat storage member according to any one of [1] to [13], wherein the surface of the coating layer is disposed with protrusions having a difference between recesses and protrusions of 0.5 to 100 μm.

[15] The heat storage member according to [14], wherein density of the protrusions with respect to a surface area of the coating layer is 1 to 1000000 protrusions/10000 μm².

[16] The heat storage member according to [15], wherein the coating layer includes particulates dispersed in the coating layer and having an average particle diameter of 5 nm to 100 μm.

[17] The heat storage member according to [16], wherein the particulates are at least one of SiC particles, metal Si particles, Si—SiC particles, and C particles.

[18] The heat storage member according to any one of [1] to [17], wherein the heat storage material includes at least one selected from the group consisting of oxides of Mg, Ca, Sr, Ba, hydroxides of Mg, Ca, Sr, Ba, carbonates of Mg, Ca, Sr, Ba, chlorides of Mg, Ca, Sr, Ba, sulfates of Mg, Ca, Sr, Ba, and zeolite.

[19] The heat storage member according to any one of [1] to [18], wherein the heat storage material is a particulate having an average particle diameter ranging from 5 nm to 100 μm.

A heat storage member according to an embodiment of the present invention includes a substrate containing a SiC sintered body as a principal ingredient, a coating layer disposed in a surface of the substrate, and a heat storage material disposed in a surface of the coating layer. The heat storage material herein stores and radiates heat by a reversible chemical reaction with a reaction medium, or the heat storage material stores and radiates heat by physical adsorption to a reaction medium and by physical desorption from a reaction medium. In the heat storage member according to an embodiment of the present invention, a softening point of the coating layer is a temperature at 1000° C. or less. According to the heat storage member of an embodiment of the present invention, it is possible to achieve highly-responsive heat radiation and heat absorption by a chemical reaction or physical adsorption and physical desorption between the heat storage material and the reaction medium. Furthermore, the heat storage member of an embodiment of the present invention can effectively prevent the heat storage material from peeling from the coating layer disposed in the substrate. Therefore, according to the heat storage member of an embodiment of the present invention, it is possible to achieve high durability (that is, peeling resistance of the heat storage material) when alternately repeating heat storage and heat radiation.

Furthermore, the heat storage member according to an embodiment of the present invention includes the "substrate containing the SiC sintered body as the principal ingredient" having excellent thermal conductivity as a carrier for dispersedly loading the heat storage material. Therefore, heat generated by an exothermic reaction of the heat storage material can be promptly transferred to the substrate (in other words, the heat generated by the exothermic reaction can be discharged to the substrate) through the coating film-like coating layer. Thus, it is difficult to maintain a high-temperature state of the heat storage material and it is possible to preferably advance the exothermic reaction of the heat storage material. With regard to an endothermic reaction, it is possible to preferably advance the endothermic reaction of the heat storage material by preferably transferring the heat between the heat storage material and the substrate through the coating film-like coating layer.

BRIEF DESCRIPTION OF THE DRAWINGS

FIGS. 7A to 7D are schematic views for describing the producing process of the substrate used in the heat storage member according to an embodiment of the present invention.

DESCRIPTION OF THE PREFERRED EMBODIMENTS

An embodiment of the present invention will hereinafter be described, but the present invention should not be restricted thereto. Accordingly, the following embodiment can be appropriately changed or modified within the gist of the present invention based on common knowledge of those skilled in the art. It should be understood that those changed or modified embodiments are also within the scope of the present invention.

Figure 1:
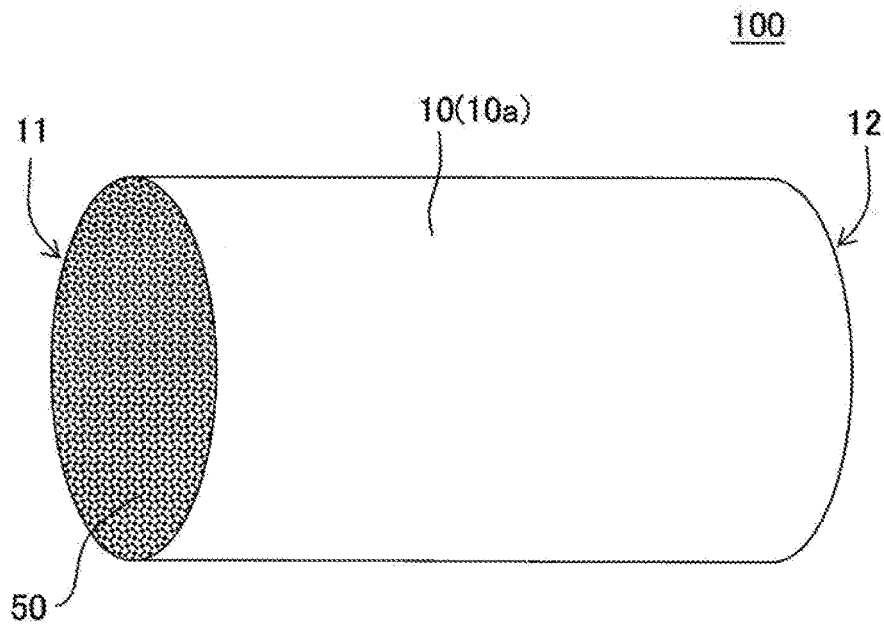
FIG. 1 is a perspective view schematically showing a heat storage member according to an embodiment of the present invention.
Figure 2:
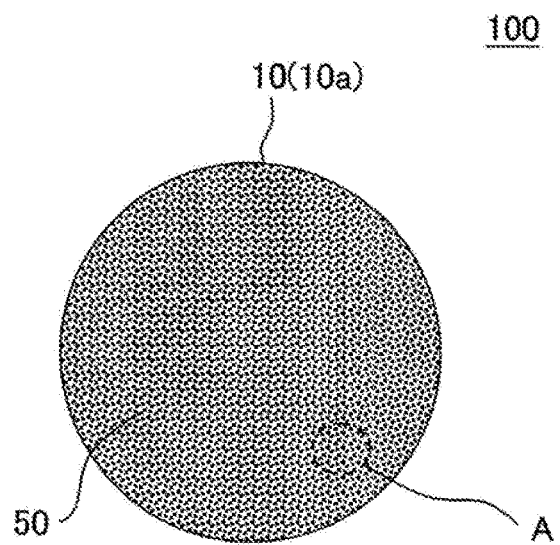
FIG. 2 is a cross sectional view schematically showing a cross section, perpendicular to a direction from a first end face to a second end face, of the heat storage member shown in FIG. 1.

(1) Heat Storage Member:

A heat storage member according to an embodiment of the present invention is a heat storage member 100 shown in FIGS. 1 to 4. The heat storage member 100 of the present embodiment includes a substrate 10 containing a SiC sintered body 10a as a principal ingredient, a coating layer 51 disposed in a surface of the substrate 10, and a heat storage material 50 disposed in a surface of the coating layer 51. The heat storage material 50 stores and radiates heat by a reversible chemical reaction with a reaction medium, or a heat storage material 50 stores and radiates heat by physical adsorption to a reaction medium and physical desorption from a reaction medium. In the heat storage member 100 of the present embodiment, a softening point of the coating layer 51 is a temperature at 1000° C. or less. FIG. 1 and FIG. 2 each show an example that the substrate 10 has a round pillar shape including a first end face 11 and a second end face 12.

According to the heat storage member 100 of the present embodiment, it is possible to achieve highly-responsive heat radiation and heat absorption by the chemical reaction or physical adsorption and physical desorption between the heat storage material 50 and the reaction medium. The heat storage member 100 of the present embodiment can effectively prevent the heat storage material 50 from peeling from the coating layer 51 disposed in the substrate 10. Therefore, according to the heat storage member 100 of the present embodiment, it is possible to achieve high durability (that is, peeling resistance of the heat storage material 50) when alternately repeating heat storage and heat radiation.

For example, in a case of applying $Ca(OH)_2$ as the heat storage material, $Ca(OH)_2$ turns into CaO by heating to a temperature of 500 to 600° C. In a case of applying $CaCO_3$ as the heat storage material, $CaCO_3$ can be decomposed into CaO and $CO_2$ by heating to a temperature of 800 to 900° C. In other words, in using the heat storage member, the substrate and coating layer undergo a heating-and-cooling cycle at an ambient temperature to about 900° C. In a case where the softening point of the coating layer 51 is higher than 1000° C., it is not preferable in that the coating layer may not sufficiently soften and that a loading property of the heat storage material considerably deteriorates, which easily causes the heat storage material to peel off.

In other words, in a case where the coating layer contains $P_2O_5$ as a principal ingredient and a content rate of $P_2O_5$ is less than 20% by mass, it is not preferable in that the softening point of the coating layer is considerably high so that the coating layer may not sufficiently soften in the heating-and-cooling cycle at the ambient temperature to about 900° C. and that the heat storage material may be easily peeled off. Furthermore, in a case where the content rate of $P_2O_5$ exceeds 45% by mass, it is not preferable in that the substrate is easily fused by a reaction between $P_2O_5$ contained in the coating layer and SiC contained in the substrate.

In other words, in a case where the coating layer contains $B_2O_3$ as the principal ingredient and a content rate of $B_2O_3$ is less than 20% by mass, it is not preferable in that the softening point of the coating layer is considerably high so that the coating layer may not sufficiently soften in the heating-and-cooling cycle at the ambient temperature to about 900° C. and that the heat storage material is easily peeled off. Furthermore, in a case where the content rate of $B_2O_3$ exceeds 45% by mass, it is not preferable in that the substrate is easily fused by a reaction between $B_2O_3$ contained in the coating layer and SiC contained in the substrate.

In other words, in a case where the coating layer contains $Bi_2O_3$ as the principal ingredient and a content rate of $Bi_2O_3$ is less than 65% by mass, it is not preferable in that the softening point of the coating layer is considerably high so that the coating layer may not sufficiently soften in the heating-and-cooling cycle at the ambient temperature to about 900° C. and that the heat storage material is easily peeled off Furthermore, in a case where the content rate of $Bi_2O_3$ exceeds 85% by mass, it is not preferable in that the substrate is easily fused by a reaction between $Bi_2O_3$ contained in the coating layer and SiC contained in the substrate.

Furthermore, the heat storage member 100 of the present embodiment applies the "substrate 10 containing the SiC sintered body 10a as the principal ingredient" having excellent thermal conductivity as a carrier for dispersedly loading the heat storage material 50. Therefore, heat generated by an exothermic reaction of the heat storage material 50 can be promptly transferred to the substrate 10 (in other words, the heat generated by the exothermic reaction can be discharged to the substrate 10) through the coating film-like coating layer 51. Accordingly, it is difficult to maintain a high-temperature state of the heat storage material 50 and it is possible to preferably advance the exothermic reaction of the heat storage material 50. With regard to an endothermic reaction, it is possible to preferably advance the endothermic reaction of the heat storage material 50 by preferably transferring the heat between the heat storage material 50 and the substrate 10 through coating film-like coating layer 51.

Figure 3:
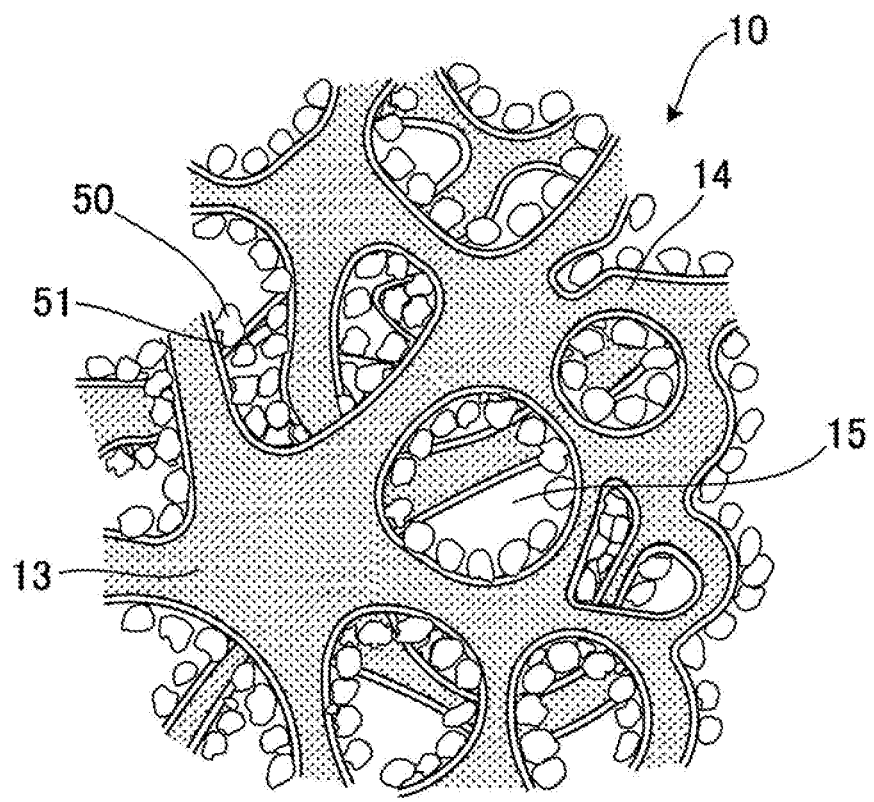
FIG. 3 is a schematic view enlarging a range shown by A in the heat storage member shown in FIG. 2.
Figure 4:
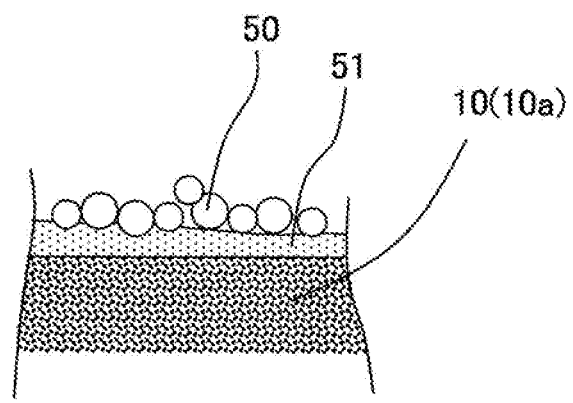
FIG. 4 is a schematic view further enlarging a part of the range shown in FIG. 3.

Herein, FIG. 1 is a perspective view schematically showing the heat storage member according to an embodiment of the present invention. FIG. 2 is a cross sectional view schematically showing a cross section, perpendicular to a direction from the first end face to the second end face, of the heat storage member shown in FIG. 1. FIG. 3 is a schematic view enlarging a range shown by A in the heat storage member shown in FIG. 2. FIG. 4 is a schematic view further enlarging a part of the range shown in FIG. 3.

In the heat storage member 100 of the present embodiment, the substrate 10 containing the SiC sintered body 10a as the principal ingredient may include a void 15 which serves as a flow channel of the reaction medium. As shown in FIG. 3, in the heat storage member 100 of the present embodiment, the coating layer 51 is disposed like a coating film to the surface of the substrate 10 on which the void 15 is formed, and the heat storage material 50 is disposed in the surface of the coating layer 51. Such a substrate 10 enables a surface area of the substrate 10 in which the heat storage material 50 is disposed to be increased and a sufficient contact area between the heat storage material 50 and the reaction medium to be obtained. Accordingly, it is possible to achieve high reactivity of the exothermic reaction and endothermic reaction of the heat storage material 50, and heat radiation and heat absorption with high responsiveness. Furthermore, the substrate 10 is preferably a porous material including a void which serves as the flow channel of the reaction medium so that the substrate 10 may be a material including a three-dimensional network structure 14 as shown in FIGS. 1 to 3.

Figure 5:
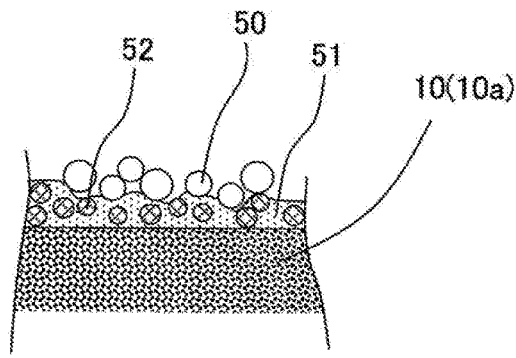
FIG. 5 is a schematic view enlarging a range, similar to the range shown in FIG. 4, in a heat storage member according to another embodiment of the present invention.

Furthermore, the coating layer 51 may include particulates 52 dispersed in the coating layer 51 as shown in FIG. 5. Including such particulates 52 enables a specific surface area of the coating layer 51 to be increased and an amount of the heat storage material 50 to be loaded (disposed) to the substrate 10 to be increased. FIG. 5 is a schematic view enlarging a range, similar to the range shown in FIG. 4, in a heat storage member according to another embodiment of the present invention. In FIG. 5, structural elements similar to those shown in FIG. 4 are denoted with the reference numerals as in FIG. 4 and description thereof may be omitted.

Hereinafter, each structural element of the heat storage member of the present embodiment will be described in detail.

(1-1) Substrate:

The substrate used in the heat storage member of the present embodiment is the carrier for dispersedly loading the heat storage material. As shown in FIGS. 1 to 3, the substrate 10 contains the SiC sintered body 10a as the principal ingredient. The substrate 10 may be a porous material including a void such as the substrate 10 shown in FIGS. 1 to 3 in which a skeleton 13 has a structure with a three-dimensional network. In the present disclosure, the structure with the three-dimensional network of the skeleton 13 is referred to as the "three-dimensional network structure 14".

The heat storage member of the present embodiment is utilized for recovering and storing exhaust heat from an automobile and the like, and for reusing the recovered and stored heat by radiating the heat as needed. The substrate used in the heat storage member of the present embodiment contains the SiC sintered body as the principal ingredient so that the substrate has a high thermal resistance and a high mechanical strength. As mentioned above, the substrate is excellent in thermal conductivity so that the exothermic reaction and endothermic reaction of the heat storage material can be preferably advanced by preferably transferring the heat between the heat storage material and the substrate through the coating film-like coating layer.

The shape of the substrate is not specifically restricted. For example, the substrate may have a pillar shape including a first end face and a second end face. A cross sectional shape of the pillar-shaped substrate perpendicular to a direction from the first end face to the second end face may be, for example, a polygonal shape such as square shape, circular shape, elliptical shape, oval shape, or any other intermediate shape. The shape of the substrate may be plate shape including a first end face and a second end face or may be spherical shape including no first end face and no second end face.

Hereinafter described is a preferable embodiment of the substrate 10 including the three-dimensional network structure 14 as shown in FIGS. 1 to 3.

It is preferable that the substrate 10 including the three-dimensional network structure 14 is configured to have a three-dimensional network structure including a skeleton having porosity of 1% or less. The three-dimensional network structure causes turbulent flow to occur inside the substrate. In other words, there is no restriction on orientation of the gas flow channel (inlet, outlet) in the substrate so that it is possible to improve flexibility of a design. Such a structure enables "recovery efficiency of the exhaust heat" to be enhanced when circulating exhaust gas emitted from the automobile and the like. Furthermore, for example, when a temperature of the exhaust gas is low such as at engine startup, it is possible to promptly raise the temperature of the exhaust gas by allowing the exhaust gas to flow into the substrate while generating the heat of the heat storage material. Furthermore, as mentioned above, it is possible to increase the contact area between the heat storage material and the reaction medium.

The porosity of the skeleton included in the three-dimensional network structure can be measured based on JIS R 1655 (Test method which can determine the pore size distribution of molded fine ceramics using the mercury penetration method). A minimum value of the porosity of the skeleton should not be specifically restricted as long as it is 1% or less. For example, the skeleton included in the three-dimensional network structure may be a dense skeleton substantially including no pore.

It is preferable that the void ratio of the porous material or the void ratio of the three-dimensional network structure of the substrate is ranging from 30 to 95%. Herein, the void ratio of the three-dimensional network structure of the substrate can be measured by the following manners. First, chemical components of the substrate are analyzed and theoretical density of the substrate (apparent specific gravity) is measured. For example, in a case where the substrate includes carbon and silicon carbide, the chemical components of the substrate can be measured based on JIS R 2011 (Methods for chemical analysis of refractories containing carbon and silicon-carbide). Next, a size and mass of the substrate are measured so as to calculate bulk density of the substrate. Based on these values, the void ratio of the substrate can be calculated by the following Formula (1). In a case where the void ratio of the substrate is less than 30%, it is not preferable in that an amount of the heat storage material to be loaded reduces and air permeability also deteriorates. On the other hand, when the void ratio of the substrate exceeds 95%, it is not preferable in that the strength of the substrate considerably deteriorates.

$$[\text{void ratio}=\{(\text{theoretical density}-\text{bulk density})/\text{theoretical density}\}\times 100] \quad \text{Formula (1)}$$

Furthermore, the void ratio of the porous material or the void ratio of the three-dimensional network structure of the substrate is preferably ranging from 30 to 95%, more preferably 35 to 90%, still more preferably 40 to 85%.

A content ratio of SiC or a content ratio of metal Si in the skeleton included in the substrate is preferably adjusted as follows. Hereinafter, unless otherwise restricted, the "content ratio of SiC" and "content ratio of metal Si" mean a "content ratio of SiC in the skeleton" and a "content ratio of metal Si in the skeleton" respectively. The content ratio of SiC is preferably ranging from 40 to 99.7% by mass, excluding impure ingredients inevitably contained in a raw material. For example, SiC in the skeleton included in the substrate in the present invention may inevitably contain the impure ingredients by 0.3% or less. In a case where the content ratio of SiC is less than 40% by mass, the thermal conductivity of the substrate deteriorates so that the heat generated by the heat storage material may not be sufficiently transferred to the substrate and the heat from the substrate may not be sufficiently transferred to the heat storage material in the endothermic reaction. Accordingly, there is a possibility that the reactivity of the exothermic reaction and endothermic reaction of the heat storage material may deteriorate.

The substrate containing the Si—SiC sintered body is preferably configured so that the content ratio of SiC and content ratio of metal Si in the skeleton are set within the range of the following numerical values. It is preferable that the content ratio of SiC in the skeleton is ranging from 40 to 99.7% by mass or the content ratio of metal Si is ranging from 5 to 60% by mass. For example, SiC in the skeleton included in the substrate may inevitably contain the impure ingredients by 0.3% or less. In a case where the content ratio of SiC is less than 40% by mass, the thermal conductivity of the substrate deteriorates so that the heat generated by the heat storage material may not be sufficiently transferred to the substrate and the heat from the substrate may not be sufficiently transferred to the heat storage material in the endothermic reaction. Accordingly, there is a possibility that the reactivity of the exothermic reaction and endothermic reaction of the heat storage material may deteriorate. Furthermore, in a case where the content ratio of the metal Si is more than 60% by mass, there is a possibility that the thermal conductivity of the skeleton deteriorates. In a case where the content ratio of the metal Si is less than 5% by mass, distribution of the metal Si in the skeleton may easily become uneven, which leads to unevenness of the thermal conductivity of the skeleton.

With regard to the substrate containing Si—SiC sintered body, it is preferable that the content ratio of SiC in the skeleton is ranging from 45 to 99.7% by mass or the content ratio of metal Si is ranging from 5 to 55% by mass. Herein, SiC has a relatively high modulus of elasticity (for example, the modulus of elasticity is about 400 GPa), while metal Si has a relatively low modulus of elasticity (for example, the modulus of elasticity is about 100 GPa). Therefore, by setting the content ratio of SiC and content ratio of metal Si in the skeleton within the range of the aforementioned numerical values, it is possible to reduce a modulus of elasticity of the Si—SiC sintered body. It is more preferable that the content ratio of SiC in the skeleton is ranging from 50 to 99.7% by mass or the content ratio of metal Si is ranging from 5 to 50% by mass. Reduction in the modulus of elasticity of the Si—SiC sintered body leads to improvement in thermal shock resistance. Therefore, such a structure enables the thermal shock resistance of the substrate to be improved and a long-lived substrate to be achieved.

The content ratio of SiC and content ratio of Si in the skeleton included in the substrate can be measured based on JIS R 2011 (Methods for chemical analysis of refractories containing carbon and silicon-carbide).

Herein, after the heat storage material is eliminated in advance, it is possible to measure the content ratio of SiC and content ratio of Si in the "heat storage member" onto which the heat storage material has already been loaded.

Furthermore, after the substrate is soaked into acids such as hydrofluoric acid and the coating layer is eliminated in advance, it is possible to measure the content ratio of SiC and content ratio of Si in the "substrate" in which the coating layer has already been disposed.

The thermal conductivity of the skeleton included in the substrate at the ambient temperatures is preferably 30 to 250 (W/m·K), more preferably 40 to 250 (W/m·K), and still more preferably 50 to 250 (W/m·K). Such a structure enables the heat between the substrate and the heat storage material to be more preferably exchanged, and the exothermic reaction and the endothermic reaction of the heat storage material to be preferably advanced. In a case where the thermal conductivity of the substrate is less than the aforementioned range of the numerical values, the heat generated by the heat storage material may not be sufficiently transferred to the substrate and the heat from the substrate may not be sufficiently transferred to the heat storage material in the endothermic reaction. Accordingly, there is a possibility that the reactivity of the exothermic reaction and the endothermic reaction of the heat storage material may deteriorate.

The skeleton included in the three-dimensional network structure may include protrusions in the surface of the skeleton. The protrusions in the surface of the skeleton mean that the surface of the skeleton has asperities having an average height of 0.5 to 100 µm. With regard to a method for forming the protrusions in the surface of the skeleton, for example, particulates having an average particle diameter of 0.5 to 100 µm may be adhered to the surface of the skeleton and may be sintered so as to form the protrusions. Applicable examples of the particulates include SiC powder, Si powder, Si—SiC powder, and C powder. On the surface of the skeleton, it is preferable that the protrusions formed by the particulates are formed at a density of 1 to 1000000 protrusions/10000 µm$^2$. The density of the protrusions is more preferably 10 to 100000 protrusions/10000 µm$^2$, and still more preferably 100 to 10000 protrusions/10000 µm$^2$. The height and density of the protrusions on the surface of the skeleton can be measured by the following method. By observing the substrate with an optical microscope or an electronic microscope, an average value measured based on five visual fields can be determined as the height and the density of the protrusions on the surface of the skeleton. By forming the protrusions on the surface of the skeleton, a surface area of the substrate increases and the physical contact area between the substrate and the heat storage material also increases. Therefore, it is possible to exchange the heat between the substrate and the heat storage material more preferably and to advance the exothermic reaction and the endothermic reaction of the heat storage material preferably.

(1-2) Coating Layer

In the heat storage member of the present embodiment, the coating layer is disposed in the surface of the substrate. In the porous material including the void, the surface of the substrate is referred to as the surface of the porous material forming the void. In the substrate including the three-dimensional network structure, the surface of the substrate is referred to as the surface of the skeleton included in the three-dimensional network structure. The heat storage material is dispersedly loaded onto the surface of the coating layer disposed in the surface of the substrate. In other words, the heat storage material is chemically fused into the coating layer in a contact point with the coating layer. Accordingly, adhesiveness between the coating layer and the heat storage material can be improved. The coating layer can be formed in the following manners. That is, the surface of the substrate is coated with powder which has been adjusted in advance so that the powder turns into chemical components to be included in the coating layer. Then, the powder is softened by a heat treatment so that the powder can be formed like a coating film on the surface of the substrate.

In the heat storage member of the present embodiment, the softening point of the coating layer is a temperature at 1000° C. or less. In a sintering step for disposing the coating layer in the surface of the substrate, and in the heating-and-cooling cycle at the ambient temperature to about 900° C. which is carried out on the substrate and coating layer when the heat storage member is used, such a coating layer sufficiently softens, and the loading property of the heat storage material is improved. Therefore, peeling of the heat storage material from the heat storage member can be effectively prevented.

The linear expansion coefficient of the coating layer may be $20\times10^{-6}/°$ C. or less. Alternatively, the linear expansion coefficient of the coating layer may be $10\times10^{-6}/°$ C. or less. By setting the linear expansion coefficient to $10\times10^{-6}/°$ C. or less, the linear expansion coefficient of the coating layer and that of the substrate containing the SiC sintered body become closer so that peeling of the coating layer from the substrate can be effectively prevented. In the present disclosure, it should be noted that the linear expansion coefficient is referred to as the linear expansion coefficient at a temperature of 50 to 300° C. The linear expansion coefficient of the coating layer is a value measured based on JIS R 3102 (Testing method for average linear thermal expansion of glass). A method for calculating the linear expansion coefficient from composition based on the following method is known by those skilled in the art. The linear expansion coefficient of a low-temperature region in glass can be regarded as having an additivity principle, and the linear expansion coefficient can be obtained by calculation based on a factor of the linear expansion coefficient of Danzin and percentage by mass of composition at a temperature of 25 to 325° C.

As mentioned above, preferable composition included in the coating layer is as follows.

It is preferable that the coating layer contains $P_2O_5$ as the principal ingredient, and a content rate of $P_2O_3$ is ranging from 20 to 45% by mass. The content rate of $P_2O_3$ is more preferably ranging from 25 to 40% by mass, still more preferably 30 to 35% by mass.

It is preferable that the coating layer contains $B_2O_3$ as the principal ingredient, and a content rate of $B_2O_3$ is ranging from 20 to 45% by mass. The content rate of $B_2O_3$ is more preferably ranging from 25 to 40% by mass, still more preferably 30 to 35% by mass.

It is preferable that the coating layer contains $Bi_2O_3$ as the principal ingredient, and a content rate of $Bi_2O_3$ is ranging from 65 to 85% by mass. The content rate of $Bi_2O_3$ is more preferably ranging from 67 to 83% by mass, still more preferably 70 to 80% by mass.

It is preferable that the coating layer contains as a secondary ingredient at least one of $Al_2O_3$, $SiO_2$, ZnO, $V_2O_5$, PbO, SnO, $P_2O_5$, $B_2O_3$ and $Bi_2O_3$.

It is preferable that the coating layer contains as the secondary ingredient at least one of CaO, BaO represented by RO and $Li_2O$, $Na_2O$, $K_2O$ represented by $R_2O$.

It is preferable that the coating layer contains as the secondary ingredient at least one of $TeO_2$ and $TiO_2$.

A total content rate of RO is preferably 50% or less, more preferably 45% or less, still more preferably 40% or less. A total content rate of $R_2O$ is preferably 50% or less, more preferably 45% or less, still more preferably 35% or less. Herein, in a case where the total content rate of RO exceeds 50%, it is not preferable in that the substrate is easily fused by a reaction between RO contained in the coating layer and SiC contain in the substrate. In a case where the total content rate of $R_2O$ exceeds 50%, it is not preferable in that the substrate is easily fused by a reaction between $R_2O$ contained in the coating layer and SiC contained in the substrate.

The content rate of each composition contained in the coating layer can be measured by an energy dispersive X-ray spectrometry (EDS). An applicable example of the energy dispersive X-ray spectrometry (EDS) includes a scanning electron microscope (model number: JSM-5600) manufactured by JEOL Ltd. Herein, after the heat storage material is eliminated in advance, it is possible to measure the content rate of each composition contained in the coating layer in the "heat storage member" onto which the heat storage material has already been loaded. According to compositional images obtained by using brightness difference per element, the composition of the substrate and the composition of the coating layer can be shown clearly. Therefore, with regard to the content rate of each composition contained in the coating layer in the "substrate" in which the coating layer has already been disposed, a part corresponding to the coating layer can be selectively measured by using the EDS by obtaining compositional images of a cross section of the substrate in which the coating layer is disposed.

The linear expansion coefficient of the coating layer is preferably one to five times as large as the linear expansion coefficient of the substrate, more preferably one to four times, and still more preferably one to three times.

The softening point of the coating layer is a temperature at 1000° C. or less, and preferably 950° C. or less, and more preferably 900° C. or less. In a case where a transition point of the coating layer exceeds 1000° C., it is not preferable in that the coating layer may not sufficiently soften within an operating temperature range, which considerably deteriorates the loading property of the heat storage material. The softening point of the coating layer can be measured based on JIS R 3103-1:2001 (Viscosity and viscometric fixed points of glass—Part 1: Determination of softening point). The softening point is defined as a temperature in which viscosity becomes $4.5\times10^7$ poise (Logη=13.4). The softening point of the coating layer can be measured by a differential thermogravimetric analysis (DTA). In the DTA, the softening point is defined as a temperature of a fourth inflection point.

The surface of the coating layer may include protrusions having a difference between recesses and protrusions of 0.5 to 100 μm. Such protrusions allow a surface area per unit volume of the coating layer to be increased and a physical contact area between the coating layer and the heat storage material to be increased. Therefore, it is possible to increase the amount of the heat storage material to be loaded (disposed). Increasing a physical contact area between the substrate and the heat storage material also enables the heat between the substrate and the heat storage material to be more preferably exchanged, which enables the exothermic reaction and the endothermic reaction of the heat storage material to be preferably advanced. When the surface of the coating layer includes such protrusions, abundance of the protrusions with respect to the surface area of the coating layer is preferably 1 to 1000000 protrusions/10000 μm², more preferably 10 to 1000000 protrusions/10000 μm², still more preferably 100 to 1000000 protrusions/10000 μ². The difference between recesses and protrusions as well as the abundance of the protrusions can be measured by the following method. By observing the substrate with an optical microscope or an electronic microscope, an average value measured based on five visual fields can be determined as the height and the density of the protrusions on the surface of the skeleton.

The coating layer may include particulates having high thermal conductivity and an average particle diameter of 5 nm to 100 μm dispersed in the coating layer. Such particulates in the coating layer can improve the thermal conductivity of the coating layer. The average particle diameter of the particulates dispersed in the coating layer can be measured by the following method. First, the substrate disposed with the coating layer is buried in phenol resin and the like, and then the substrate is cut. A cross section of the cut substrate is polished so as to produce a sample for measurement. Next, an observation image of the sample cross section is obtained by a scanning electron microscope. Next, a compositional image of the sample cross section is obtained by an energy dispersive X-ray spectrometry (EDS). An applicable example of the scanning electron microscope and the energy dispersive X-ray spectrometry (EDS) includes a scanning electron microscope (model number: JSM-5600) manufactured by JEOL Ltd. According to compositional images obtained by using brightness difference per element, the composition of the coating layer and the particulates disposed in the coating layer can be shown clearly. By observing the obtained compositional images, an average value measured based on five visual fields can be determined as the average particle diameter of the particulates dispersed in the coating layer.

The particulates included in the coating layer are preferably at least one of SiC particles, Si particles, C particles, and Si—SiC particles. The SiC particles, Si particles, C particles, and Si—SiC particles have a high thermal conductivity compared to the composition of the coating layer. These particulates can improve the thermal conductivity of the coating layer. Therefore, the heat generated by the exothermic reaction of the heat storage material can be promptly transferred to the substrate through the coating layer so that the exothermic reaction of the heat storage material can be preferably advanced. With regard to the endothermic reaction, the heat of the heat storage material is preferably transferred to the substrate through the coating film-like coating layer so that the endothermic reaction of the heat storage material can be preferably advanced.

The coating layer preferably has a thickness of 100 μm or less, more preferably 50 μm, still more preferably 10 μm or less. In a case where the thickness of the coating layer exceeds 100 μm, the coating layer is so thick that heat-transfer to the substrate may be disturbed by the coating layer.

(1-3) Heat Storage Material

The heat storage material applied in the heat storage member of the present embodiment is a so-called heat storage material configured to store and radiate a heat by a reversible chemical reaction with a reaction medium or a heat storage material configured to store and radiate a heat by physical adsorption to a reaction medium and by physical desorption from a reaction medium. There is no specific restriction on a material of the heat storage material as long as it is configured to store and radiate the heat by the reversible chemical reaction. An example of the heat storage material can include a material including at least one selected from the group consisting of oxides of Mg, Ca, Sr, Ba, hydroxides of Mg, Ca, Sr, Ba, carbonates of Mg, Ca, Sr, Ba, chlorides of Mg, Ca, Sr, Ba, sulfates of Mg, Ca, Sr, Ba, and zeolite.

In the heat storage member of the present embodiment, the powdery (particulate) heat storage material is preferably adhered to the surface of the void of the substrate. With regard to the powdery heat storage material, the average particle diameter of the heat storage material is preferably 5 nm to 100 μm, more preferably 10 nm to 50 μm, and still more preferably 0.1 to 10 μm. In a case where the average particle diameter of the heat storage material is less than 5 nm, it is not preferable in that the heat storage material may not be evenly disposed in the substrate due to aggregation of the heat storage material. In a case where the average particle diameter of the heat storage material is more than 100 μm, it is not preferable in that reactivity in a central part of a particle of the heat storage material deteriorates and responsiveness of heat storage and heat radiation also deteriorates. The average particle diameter of the heat storage material can be measured as follows. The average particle diameter of the heat storage material can be measured by the following method. By observing the substrate with the optical microscope or the electronic microscope, particle diameters of the heat storage material adhered to the substrate are measured. An average value of the particle diameters of the heat storage material measured based on five visual fields can be determined as the average particle diameter of the heat storage material.

The amount of the heat storage material to be disposed (loaded) in the heat storage member should not be specifically restricted, but it can be set appropriately in accordance with uses of the heat storage member.

The heat storage member of the present embodiment preferably includes the void. Herein, a "void ratio of the heat storage member" means a void ratio of the substrate with the heat storage material disposed (loaded) therein. The void ratio of the heat storage member can be measured as follows. Similarly to the method for obtaining the void ratio of the three-dimensional network structure of the substrate, first, chemical components of the heat storage member are analyzed so as to measure theoretical density (apparent specific gravity) of the heat storage member. For example, in a case where the substrate includes carbon and silicon carbide, the chemical components of the substrate can be measured based on JIS R 2011 (Methods for chemical analysis of refractories containing carbon and silicon-carbide). For example, in a case where the heat storage material is formed of magnesium oxide, it can be measured based on JIS R 2212-4 (Methods for chemical analysis of refractory products—Part 4: Magnesite and dolomite refractories). Next, a size and mass of the heat storage member are measured so as to calculate bulk density of the heat storage member. By using these values, the void ratio of the substrate can be calculated by the following Formula:

[void ratio={(theoretical density−bulk density)/theoretical density}×100].

The heat storage material is preferably powder. The heat storage material preferably has the average particle diameter of 5 nm to 100 μm. The more the heat storage material includes primary particles directly in contact with the substrate, the more it is preferable. According to such a form, it is preferable in that the heat radiated from the heat storage material can be easily transferred to the substrate. On the other hand, supposed that the surface layer of the particle of the heat storage material in contact with the substrate is laminated with another particle of the heat storage material not in contact with the substrate, in such a form, there is a possibility that the heat radiated from the heat storage material is hardly transferred to the substrate. The form of the heat storage material can be measured as follows. The form of the heat storage material can be measured by observing the heat storage material with the optical microscope or the electronic microscope and by observing a state of the heat storage material adhered to the substrate.

(2) A Method for Producing the Heat Storage Member:

Hereinafter described is a method for producing the heat storage member according to an embodiment of the present invention with reference to the method for producing the heat storage member 100 shown in FIGS. 1 to 3 as an example.

(2-1) Production of the Substrate:

First, a commonly-applied method for forming powder such as a slip casting method, a gel casting method, an extrusion method, or a pressing method can be applied to produce the substrate containing the SiC sintered body as the principal ingredient used in the heat storage member. A known method such as a replica method and a direct forming method can be applied to produce the porous substrate having the void or the substrate having the three-dimensional network structure. The Si—SiC substrate can be produced by combining the gel casting method and the replica method as follows.

Figure 6:
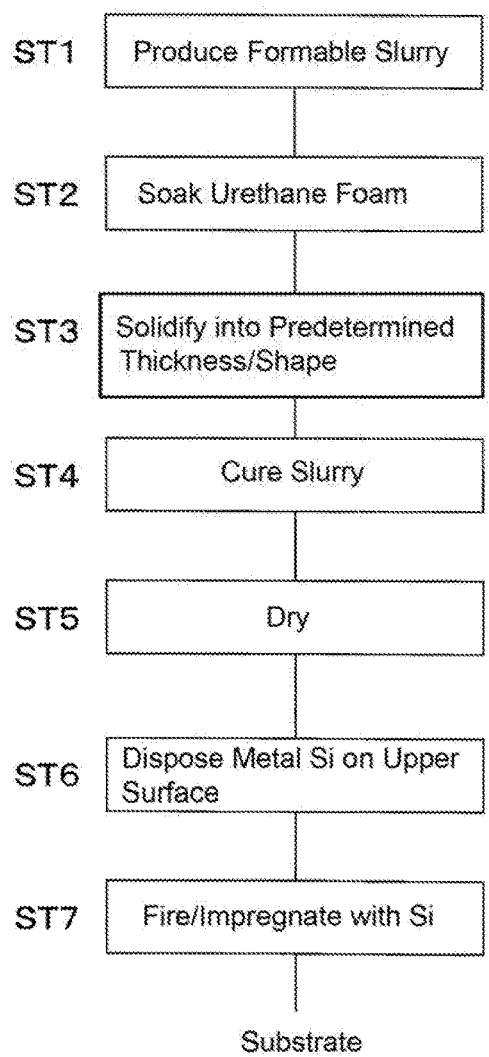
FIG. 6 is a flowchart for describing a producing process of a substrate used in the heat storage member according to an embodiment of the present invention.

The Si—SiC substrate can be produced by the gel casting method by following steps (ST1) to (ST7) shown in FIG. 6. The gel casting method is one of methods for forming a pulverulent body. For example, in the gel casting method, one or more types of pulverulent bodies selected from the group consisting of ceramic, glass, and metal are dispersed in a dispersing medium by using a dispersing agent so as to produce a slurry including the powder. Next, a material having gelation ability (a gellant) is added to the obtained slurry and the slurry is cured so as to obtain a formed body of any shape. FIG. 6 is a flowchart for describing a producing process of the substrate used in the heat storage member according to an embodiment of the present invention. Hereinafter, the steps (ST1) to (ST7) shown in FIG. 6 will be described in more detail.

(2-1a) ST1:

The substrate used in the heat storage member can be produced by the gel casting method so that, first, a formable slurry (SiC slurry) is produced. The formable slurry can be produced by dispersing SiC powder in an organic solvent to make it into a slurry and then by adding a gellant to the obtained slurry. The formable slurry can also be produced by adding the SiC powder and the gellant to the organic solvent simultaneously and by dispersing the resultant.

Other than the SiC powder, pulverulent bodies of carbon, boron carbide, and the like may be appropriately mixed to be used. It should be noted that each particle diameter of various pulverulent bodies should not be specifically restricted, and it can be appropriately selected as long as the formable slurry can be produced.

Examples of the organic solvent used as the dispersing medium include polyhydric alcohols, polybasic acids and esters. Examples of the polyhydric alcohols include diols such as ethylene glycol and triols such as glycerin. Examples of the polybasic acids include dicarboxylic acid. Examples of the esters include polybasic acid esters, esters of polyhydric alcohols. It should be noted that examples of the polybasic acid esters include dimethylglutaric acid, dimethylmalonic acid. Examples of esters of polyhydric alcohols include triacetin.

The gellant is preferably an organic compound including a reactive functional group and capable of curing the formable slurry. Examples of such an organic compound include three-dimensionally cross-linked prepolymers with a cross-linking agent involved such as urethane resin, acrylic resin, epoxy resin, and phenol resin. Taking into consideration the reactivity with the organic compound in the dispersing medium, it is preferable to select an organic compound including a preferable reactive functional group as the gellant. For example, in a case of using esters having relatively low reactivity as the organic solvent, it is preferable to select an organic compound including an isocyanate group (—N=C=O) and/or isothiocyanate group (—N=C=S) having high reactivity as the organic compound including the reactive functional group included in the gellant.

Taking workability into consideration, it is preferable that the formable slurry has viscosity of slurry of 50 dPa·s or less at 20° C. It is more preferable that the formable slurry has viscosity of slurry of 20 dPa·s or less at 20° C. The viscosity of slurry is a value measured by a commercially-available B type viscometer (Viscotester VT-04F manufactured by RION Co., Ltd.).

In such manners, in producing the formable slurry (ST1), first, the ceramic pulverulent bodies, the dispersing medium, and the dispersing agent are compounded and mixed together. Then, the gellant as well as a catalyst and the like are added to the mixture to carry out final compound. The obtained formable slurry is preferably defoamed before impregnating urethane foam having the three-dimensional network structure with the formable slurry. In FIGS. 7A to 7D, a method for producing the Si—SiC substrate having the three-dimensional network structure will be described with reference to two-dimensional schematic views. FIG. 7A is a view schematically showing a two-dimensional cross section of the urethane foam having the three-dimensional network structure.

Mixture of the formable slurry is carried out in a pot mill, a ball mill, or the like. It is preferred that mixture is carried out by using a nylon cobble stone at a temperature of 15° C. to 35° C. for 12 hours or more, more preferably for 72 hours or more. Furthermore, the defoaming of the slurry is preferably carried out by stirring the slurry under a vacuum atmosphere having a degree of vacuum of −0.090 MPa or less. The degree of vacuum at the time of defoaming is preferably −0.095 MPa or less. Stirring speed is preferably 100 rpm to 500 rpm. Stirring time is preferably 5 minutes to 30 minutes.

(2-1b) (ST2) to (ST4):

The formable slurry produced in (ST1) is impregnated with the urethane foam having the three-dimensional network structure. After that, the resultant is squeezed to such an extent that the formable slurry may not close pores of the urethane foam, and surplus slurry is eliminated. Then, the formable slurry is disposed on a solidifying device and is left to stand at an ambient temperature to 40° C. for couple of hours to tens of hours. Accordingly, the formable slurry turns into gel and is cured into the formed body.

As shown in FIG. 7A, the urethane foam having the three-dimensional network structure includes a skeleton part 4 and a void part 5. In (ST2), as shown in FIG. 7B, a SiC slurry formed body 9 is formed facing the void part 5. Herein, the SiC slurry formed body 9 represents the formed body including the formable slurry obtained in (ST1). In FIGS. 7A to 7D, a reference numeral 7 denotes the metal Si. A reference numeral 1 denotes the core part of the skeleton which is impregnated with the metal Si. A reference numeral 3 denotes the surface layer part of the skeleton. A reference numeral 15 denotes the void in the three-dimensional network structure.

(2-1c) (ST5):

Next, the SiC slurry formed body 9 is dried at a temperature of 40° C. to 100° C. for 3 to 12 hours and is further dried at a temperature of 100° C. to 200° C. for 3 to 12 hours.

(2-1d) (ST6) to (ST7):

As shown in FIG. 7C, the metal Si 7 is disposed on the upper surface of the dried SiC slurry formed body 9 and is heated under an inert gas atmosphere at a temperature of 1400° C. to 1500° C. for 1 to 3 hours. The skeleton part 4 of the urethane foam is destroyed by fire at a temperature of 500° C. or so. As shown in FIG. 7D, a space formed by the destruction of the skeleton part 4 is impregnated with the metal Si 7 so as to obtain the substrate including the intricate Si—SiC skeleton having the three-dimensional network structure. According to this method, it is possible to impregnate the skeleton including the SiC slurry formed body 9 with the metal Si 7 so that a uniform impregnation can be achieved without clogging the void part 5 with the metal Si 7. The void ratio of the substrate produced in such a method is ranging, for example, from 30 to 95%. Herein, FIGS. 7A to 7D are schematic views showing the producing process of the substrate used in the heat storage member according to an embodiment of the present invention.

(2-2) Formation of the Coating Layer:

Next, the coating layer is formed on the surface of the substrate produced hitherto. More specifically, the coating layer is formed on the surface of the skeleton included in the three-dimensional network structure. In forming the coating layer, first, prepared herein is raw material powder for the coating layer adjusted to contain desired composition. With regard to the raw material powder for the coating layer, the average particle diameter is preferably 5 nm to 100 μm, more preferably 10 nm to 50 μm, and still more preferably 0.1 to 10 μm. The average particle diameter of the raw material powder for the coating layer can be measured as follow. By observing the raw material powder for the coating layer with the optical microscope or the electronic microscope, particle diameters of the raw material powder for the coating layer are measured. An average value of the raw material powder for the coating layer measured based on five visual fields can be determined as the average particle diameter of the raw material powder for the coating layer.

The raw material powder for the coating layer preferably contains the composition illustrated in the description of the coating layer as preferable composition.

Next, such raw material powder for the coating layer is dispersed in water or an organic solvent so as to produce raw material slurry for the coating layer. After coating the surface of the substrate with the raw slurry for the coating layer, the surface of the substrate is dried and fired, and the coating film-like coating layer can be formed. A method for coating the raw material slurry for the coating layer should not be specifically restricted. The method for coating the raw material slurry for the coating layer can include any optimal methods such as dipping (soaking) or a spray coating method. After coating the surface of the substrate with the raw slurry for the coating layer, the surface of the substrate is dried at a temperature of 100 to 200° C., the raw material powder for the coating layer is fired at a temperature of 300 to 1000° C. under the atmosphere, and the softened raw material powder for the coating layer is fused into the substrate. In such manners, the coating film-like coating layer can be formed.

(2-3) Production of the Heat Storage Material:

Hereinafter, the heat storage material used in the heat storage member is produced. A method for producing the heat storage material should not be specifically restricted and the heat storage material can be obtained by a known method. Commercially-available powder such as calcium carbonate powder, calcium hydroxide powder, or calcium oxide powder can be used. The powder is appropriately pulverized by using a commercially-available pot mill and a sieve to have a predetermined average particle diameter, and then the powder is classified to be used. The average particle diameter of the powder can be measured by using a commercially-available laser diffraction/scattering particle size analyzer.

(2-4) Disposition (Loading) of the Heat Storage Material to the Coating Layer

Next, the obtained heat storage material is dispersed in water or an organic solvent so as to produce a heat storage material slurry. Next, the surface of the coating layer formed on the surface of the substrate is coated with the produced heat storage material slurry. Then, the surface of the coating layer is dried and fired so as to dispose (load) the heat storage material in the coating layer. A method for coating the heat storage material slurry should not be specifically restricted. The method for coating the heat storage material slurry can include any optimal methods such as dipping (soaking) or a spray coating method. After coating the heat storage material slurry and the surface of the coating layer is dried at a temperature of 100 to 200° C., the heat storage material is fired at a temperature of 300 to 1000° C. under the atmosphere so that the heat storage material is fused into the coating layer. In such manners, the heat storage material can be disposed (loaded) in the coating layer.

In such manners, the heat storage member of the present embodiment can be produced. It should be noted that the method for producing the heat storage member should not be restricted to the method mentioned above.

(3) Method of Using the Heat Storage Member:

In the heat storage member of the present embodiment, when an environmental temperature becomes equal to or higher than a heat-storage operative temperature, the endothermic reaction (for example, dehydration reaction) of the heat storage material occurs and a composition of the heat storage material changes. This endothermic reaction causes a heat-storage state of the heat storage material where the heat is recovered and stored. After that, the heat storage material in the heat-storage state is brought into contact with the reaction medium (for example, water), which causes the exothermic reaction (hydration reaction) of the heat storage material in the heat-storage state and causes radiation of the heat. Unless the heat storage material in the heat-storage state is brought into contact with the reaction medium, even when the environmental temperature becomes lower than the heat-storage operative temperature, the heat storage material maintains its original form (that is, the heat-storage state). Therefore, there is no need to provide a heat insulating structure which is necessary in a latent heat storage body.

For example, the heat storage member of the present embodiment can be utilized for recovering and storing the exhaust heat of the automobile and the like and for using the recovered and stored heat for activation of a catalyst (catalyst for disposing exhaust gas) at the engine startup. Furthermore, the heat storage member herein can be utilized for a heater inside a cabin (indoor) of the automobile. For example, the chemical heat storage member using calcium hydroxide ($Ca(OH)_2$) as the heat storage material can be utilized by being disposed upstream of a place where the catalyst for disposing exhaust gas in an automotive exhaust system is disposed. It is preferred that a reaction medium generating device of a water vapor generating device is disposed upstream of the place where the chemical heat storage member in the automotive exhaust system is disposed. When high-temperature exhaust gas emitted from the automobile flows into the chemical heat storage member disposed in the automotive exhaust system, the calcium hydroxide which is the heat storage material triggers the endothermic reaction (dehydration reaction). In other words, a water molecule ($H_2O$) is desorbed from the heat storage material due to the endothermic reaction (dehydration reaction), and the heat storage material turns into calcium oxide (CaO). The heat storage material whose composition has changed to the calcium oxide is in the heat-storage state where the heat of the exhaust gas is recovered and stored. In startup of the engine, water vapor is generated from the reaction medium generating device and the generated water vapor ($H_2O$) is reacted with the calcium oxide (CaO) which is the heat storage material. This reaction is the exothermic reaction (hydration reaction), and the heat storage material radiates the heat.

EXAMPLES

The present invention will hereinafter be described in more detail based on Examples. It should be noted that the present invention should not be restricted to the following Examples.

Example 1

First, SiC powder of 99.7 parts by mass and metal Si powder of 0.3 parts by mass were mixed to obtain a mixed powder. A binder, a pore former, and water were added to this mixed powder so as to prepare a kneaded material for molding. As the SiC powder, the powder having an average particle diameter of 100 μm was applied. As the Si powder, the powder having an average particle diameter of 10 μm was applied.

Next, the prepared kneaded material for molding was formed by extrusion so as to obtain a Si—SiC formed body including a void.

Next, the obtained Si—SiC formed body was fired at a temperature of 1440° C. for 5 hours so as to produce a porous Si—SiC substrate including the void. The obtained substrate had a round pillar shape having an axial length of 100 mm and including a first end face and a second end face each having a radius of 50 mm.

With regard to the obtained substrate, a "content ratio of SiC and content ratio of Si in the substrate" was measured by the following method. Furthermore, the "void ratio" of the substrate was measured by the following method. The measurement results are shown in Table 1.

TABLE 1

|  |  | Example 1 | Example 2 | Example 3 | Example 4 | Example 5 |
|---|---|---|---|---|---|---|
| Substrate | Material | SiC | SiC | SiC | SiC | SiC |
|  | SiC content (% by mass) | 99.6 | 99.6 | 99.6 | 99.6 | 99.6 |
|  | Metal Si content (% by mass) | 0.2 | 0.2 | 0.2 | 0.2 | 0.2 |
|  | Void ratio (%) | 34 | 34 | 34 | 34 | 34 |
|  | Shape of heat storage member | A round pillar shape having an axial length of 100 mm and including a first end face and second end face each having a radius of 50 mm. | | | | |
| Coating layer | $P_2O_5$ content (% by mass) | 22 | 36 | 42 | — | — |
|  | $B_2O_3$ content (% by mass) | 20 | 6 | — | 18 | 29 |
|  | $Bi_2O_3$ content (% by mass) | — | — | — | — | — |
|  | $Al_2O_3$ content (% by mass) | 20 | 20 | 20 | 10 | 10 |
|  | $SiO_2$ content (% by mass) | — | — | — | 15 | — |
|  | ZnO content (% by mass) | — | — | — | 10 | 14 |
| RO content | CaO | 1 | 1 | 1 | 10 | 10 |
|  | BaO | — | — | 10 | 10 | 10 |
| $R_2O$ content | $Li_2O$ | 5 | 5 | 5 | 5 | 5 |
|  | $Na_2O$ | 15 | 15 | 15 | 15 | 15 |
|  | $K_2O$ | 15 | 15 | 15 | 5 | 5 |
|  | Softening point (° C.) | 410 | 405 | 405 | 565 | 570 |
|  | Linear expansion coefficient ($\times 10^{-6}$/° C.) | 16 | 16 | 16 | 10 | 10 |
|  | Presence or absence of particulates | Absence | Absence | Absence | Absence | Absence |
|  | Type of particulates | — | — | — | — | — |
| Heat storage material | Type of heat storage material | CaO | CaO | CaO | CaO | CaO |
|  | Particle size of heat storage material | 1 μm | 1 μm | 1 μm | 1 μm | 1 μm |
| Evaluation | Presence or absence of fusion of substrate | B | B | B | B | B |
|  | Rate of temperature rise | B | B | B | B | B |
|  | Thermal shock resistance | B | B | B | B | B |
|  | Peeling resistance | B | B | B | B | B |

|  |  | Example 6 | Example 7 | Example 8 | Example 9 | Example 10 |
|---|---|---|---|---|---|---|
| Substrate | Material | SiC | SiC | SiC | SiC | SiC |
|  | SiC content (% by mass) | 99.6 | 99.6 | 99.6 | 99.6 | 99.6 |
|  | Metal Si content (% by mass) | 0.2 | 0.2 | 0.2 | 0.2 | 0.2 |
|  | Void ratio (%) | 34 | 34 | 34 | 34 | 34 |
|  | Shape of heat storage member | A round pillar shape having an axial length of 100 mm and including a first end face and second end face each having a radius of 50 mm. | | | | |

TABLE 1-continued

| | | | | | | |
|---|---|---|---|---|---|---|
| Coating layer | $P_2O_5$ content (% by mass) | — | — | — | — | — |
| | $B_2O_3$ content (% by mass) | 43 | 43 | — | — | — |
| | $Bi_2O_3$ content (% by mass) | — | — | 68 | 73 | 83 |
| | $Al_2O_3$ content (% by mass) | 10 | 10 | 5 | 5 | 5 |
| | $SiO_2$ content (% by mass) | — | 10 | — | — | — |
| | ZnO content (% by mass) | — | — | 10 | 10 | 10 |
| | RO content  CaO | 10 | 10 | 15 | 10 | — |
| | BaO | 10 | — | — | — | — |
| | $R_2O$ content  $Li_2O$ | 5 | 5 | — | — | — |
| | $Na_2O$ | 15 | 15 | — | — | — |
| | $K_2O$ | 5 | 5 | — | — | — |
| | Softening point (° C.) | 570 | 565 | 515 | 520 | 520 |
| | Linear expansion coefficient ($\times 10^{-6}$/° C.) | 10 | 10 | 9 | 9 | 9 |
| | Presence or absence of particulates | Absence | Absence | Absence | Absence | Absence |
| | Type of particulates | — | — | — | — | — |
| Heat storage material | Type of heat storage material | CaO | CaO | CaO | CaO | CaO |
| | Particle size of heat storage material | 1 μm | 1 μm | 1 μm | 1 μm | 1 μm |
| Evaluation | Presence or absence of fusion of substrate | B | B | B | B | B |
| | Rate of temperature rise | B | B | B | B | B |
| | Thermal shock resistance | B | B | B | B | B |
| | Peeling resistance | B | B | B | B | B |

(Content Ratio of SiC and Content Ratio of Si in the Substrate)

The content ratio of SiC and the content ratio of Si in the substrate were measured based on JIS R 2011 (Methods for chemical analysis of refractories containing carbon and silicon-carbide).

(Void Ratio of the Substrate)

Theoretical density (apparent specific gravity) of the substrate and bulk density of the substrate were measured so as to calculate the void ratio of the substrate based on the aforementioned Formula (1).

The obtained substrate was formed with a coating layer by the following method. First, a raw material powder for the coating layer was adjusted so that $P_2O_5$ content in composition thereof is set to 24%, $Al_2O_3$ content is set to 18% and CaO content represented by RO is set to 1%. Next, the adjusted raw material powder for the coating layer was dispersed in water so as to produce a glass powder slurry. Next, a surface of the substrate was coated with the produced glass powder slurry by dipping (soaking) the glass powder slurry. Thereafter, the surface of the substrate was dried at a temperature of 100° C. for 4 hours and was fired at a temperature of 800° C. for 1 hour under the atmosphere. In such manners, the raw material powder for the coating layer was fused into the substrate so as to form the coating layer.

Next, a heat storage material to be disposed in the obtained substrate was produced. With regard to the heat storage material, commercially-available calcium carbonate powder (manufactured by Wako Pure Chemical Industries, Ltd.) was used. The powder was pulverized to have an average particle diameter of 1 μm by using a pot mill and a sieve, and then the powder was classified. The average particle diameter was a median size measured by using a laser diffraction/scattering particle size analyzer (LA-950) manufactured by HORIBA, Ltd.

Next, the produced heat storage material was dispersed in water so as to produce a heat storage material slurry. Next, a surface of the glass coating layer formed on the surface of the substrate was coated with the produced heat storage material slurry by dipping (soaking) the heat storage material slurry. Then, the surface of the glass coating layer was dried at a temperature of 100° C. for 4 hours and was fired at a temperature of 800° C. under the atmosphere. In such manners, the heat storage material was fused into the coating layer so as to dispose (load) the heat storage material in the coating layer.

With regard to the obtained heat storage member, the composition of the coating layer was measured by the method described above by using an energy dispersive X-ray spectrometry (EDS). The results are shown in Table 1.

With regard to the obtained heat storage member, a softening point of the coating layer was measured by the following method. Furthermore, a linear expansion coefficient of the coating layer was measured by the following method. The softening point of the coating layer was measured by carrying out a differential thermogravimetric analysis (DTA) on the "substrate to which the coating layer was disposed" after the heat storage material was eliminated from the heat storage member. The softening point was a temperature at 413° C. With regard to the linear expansion coefficient of the coating layer, after the heat storage material was eliminated from the heat storage member, the "substrate in which the coating layer was disposed" was measured based on JIS R 3102 (Testing method for average linear thermal expansion of glass). The linear expansion coefficient at a temperature of 50 to 300° C. was $15 \times 10^{-6}$. The results are shown in Table 1.

With respect to the obtained heat storage member, a "presence or absence of fusion" of the substrate, a "rate of temperature rise", a "thermal shock resistance", and a "peeling resistance" of the heat storage material were evaluated by the following method. The evaluation results are shown in Table 1.

(Presence or Absence of Fusion of the Substrate)

A presence or absence of fusion of the substrate was evaluated by the following method. With regard to the heat storage member disposed with the heat storage material, the substrate was observed based on five visual fields with the optical microscope so as to evaluate the presence or absence of fusion of the substrate.

(Rate of Temperature Rise)

The rate of temperature rise was evaluated by using a commercially-available thermogravimetry for differential thermal analysis (TG-DTA). Measured herein was the time taken from a point when starting addition of a reaction medium (water vapor) to the heat storage member to a point when gas flowing out of the heat storage member reaching a peak temperature.

(Evaluation on the Thermal Shock Resistance of the Substrate)

The thermal shock resistance of the substrate was evaluated by the following method. First, the substrate was rapidly heated at a temperature of 600° C./min by using a gas burner. Then, the substrate was left to stand in the atmosphere and allowed to be naturally cooled. After repeating the rapid heating by the gas burner and the natural cooling, a state of the substrate to be evaluated was checked. In the evaluation on the thermal shock resistance of the substrate, the number of repetitions until the substrate was ruptured was measured.

(Evaluation on the Peeling Resistance of the Heat Storage Material)

The reaction medium (water vapor) was added to the heat storage member so as to raise the temperature of the heat storage member, and the resultant was cooled. Rising temperature and cooling down were repeatedly carried out. Then, the state of the heat storage material was checked. In the evaluation on the peeling resistance of the heat storage material, the number of repetitions until the heat storage material was peeled off was measured. Criterion for each evaluation is shown in Table 2. In the criterion of Table 2, the evaluation "A" represents the most excellent, and the evaluation "B" represents the second most excellent. The evaluation "C" is the worst.

are shown as "presence" in a column of "presence or absence of particulates" in Table 3. On the other hand, those heat storage members including no particulates in their coating layer such as the heat storage member in Example 1 are shown as "absence" in a column of "presence or absence of particulates" in Table 1. An average particle diameter of the particulates dispersed in the coating layer was measured by observing compositional images by using an energy dispersive X-ray spectrometry (EDS). Evaluation results regarding the produced heat storage member are shown in Table 3.

Examples 15 to 19

Each heat storage member was produced in the same manner as in Example 1 except that commercially-available magnesium hydroxide (manufactured by Wako Pure Chemical Industries, Ltd.), magnesium chloride (manufactured by Wako Pure Chemical Industries, Ltd.), strontium carbonate (manufactured by Wako Pure Chemical Industries, Ltd.), barium sulfate (manufactured by Wako Pure Chemical Industries, Ltd.), and zeolite (manufactured by Tosoh Corporation) were used as a heat storage material. Evaluation results regarding the produced heat storage member are shown in Table 4.

Examples 20 to 23

Each heat storage member was produced in the same manner as in Example 1 and Examples 15 to 19 except that each heat storage material has a different average particle

TABLE 2

| Criterion for evaluation | | A | B | C |
|---|---|---|---|---|
| Presence or absence of fusion of substrate | | Absence | Presence (no bubbles) | Absence (with bubbles) |
| Rate of temperature rise | Time taken till reaching a peak of temperature rise | under 20 seconds | under 30 seconds | 31 seconds or more |
| Thermal shock resistance | Number of repetitions until substrate was ruptured | ten times or more | twice or more | once |
| Peeling resistance | Number of repetitions until heat storage material was peeled off | ten times or more | twice or more | once |

Examples 2 to 10

Each heat storage member was produced in the same manner as in Example 1 except that a coating layer was formed by changing composition of raw material powder for the coating layer. Composition and a softening point of each coating layer in Examples 2 to 10 were found to be those shown in Table 2. Evaluation results regarding the produced heat storage member are shown in Table 1.

Examples 11 to 14

Each heat storage member was produced in the same manner as in Example 1 except that a coating layer was formed so as to include protrusions having a difference between recesses and protrusions of 0.5 to 100 μm. Each coating layer in Examples 11 to 14 was a layer including at least one of SiC particles, metal Si particles, Si—SiC particles, and C particles in the glass coating layer. Those heat storage members including particulates in their coating layer such as the heat storage members in Examples 11 to 14 diameter. Evaluation results regarding the produced heat storage member are shown in Table 5.

Example 24

In Example 24, a substrate having a three-dimensional network structure was produced by the following method. First, SiC powder was dispersed in an organic solvent so as to make SiC slurry mixed with urethane resin (isocyanate and catalyst) as a gellant. An ester was used as the organic solvent. SiC had an average particle diameter of 0.7 μm. The average particle diameter of SiC was a median size measured by using a laser diffraction/scattering particle size analyzer (LA-950) manufactured by HORIBA, Ltd.

Next, prepared herein was a urethane foam having an axial length of 100 mm and having a round shape with a first end face and a second end face each having a radius of 50 mm. Urethane foam with 8 cells (cells/25 mm) was used herein. This urethane foam was soaked into the SiC slurry produced in advance and surplus SiC slurry was eliminated. After that, the SiC slurry was cured so as to obtain a formed body in which a SiC layer was formed on a surface of a skeleton of the urethane foam. Next, the obtained formed body was dried at a temperature of 120° C. for 4 hours so as to obtain a SiC formed body.

Next, the obtained SiC formed body was disposed so that a round pillar-shaped side face faced upward in a vertical direction, and metal Si was disposed on an upper surface of the SiC formed body. With regard to an amount of the metal Si, a mass of the metal Si was set to 110 parts by mass when a mass of the SiC formed body was set to 100 parts by mass. Next, the SiC formed body on which the metal Si was mounted was fired under an argon atmosphere at a temperature of 1500° C. for 1 hour so as to produce a substrate including a Si—SiC sintered body having the three-dimensional network structure.

The obtained substrate had a round pillar shape having an axial length of 100 mm and including a first end face and a second end face each having a radium of 50 mm.

Furthermore, the obtained substrate was found to have the three-dimensional network structure including the skeleton derived from the urethane foam. A porosity of the skeleton was 0.8%. A void ratio of the substrate was 92%. A content ratio of SiC of the skeleton was 58%, and a content ratio of Si of the skeleton was 40%.

A heat storage member was produced in the same manner as in Example 1 except for using a substrate including the three-dimensional network structure produced in such manners. Evaluation results regarding the produced heat storage member are shown in Table 6.

Examples 25 and 26

Each heat storage member was produced in the same manner as in Example 18 except that a mass of metal Si in each Example was changed to 10 parts by mass and 140 parts by mass when a mass of a SiC formed body was set to 100 parts by mass. Evaluation results regarding the produced heat storage member are shown in Table 6.

Comparative Examples 1 to 6

In Comparative Examples 1 to 6, each heat storage member was produced in the same manner as in Example 1 except that a coating layer was formed by changing composition of raw material powder for the coating layer. Evaluation results regarding the produced heat storage member are shown in Table 7.

Comparative Examples 7 to 12

In Comparative Examples 7 to 12, each heat storage member was produced in the same manner as in Example 24 except that a glass coating layer was formed by changing composition of glass powder. Evaluation results regarding the produced heat storage member are shown in Table 8.

Comparative Examples 13 to 17

In Comparative Examples 13 to 17, each heat storage member was produced in the same manner as in Example 1 except that composition of a skeleton of a substrate having a three-dimensional network structure was set to composition shown in Table 9. Evaluation results regarding the produced heat storage member are shown in Table 9.

TABLE 3

| | | Example 11 | Example 12 | Example 13 | Example 14 |
|---|---|---|---|---|---|
| Substrate | Material | SiC | SiC | SiC | SiC |
| | SiC content (% by mass) | 99.6 | 99.6 | 99.6 | 99.6 |
| | Metal Si content (% by mass) | 0.2 | 0.2 | 0.2 | 0.2 |
| | Void ratio (%) | 34 | 34 | 34 | 34 |
| | Shape of heat storage member | A round pillar shape having an axial length of 100 mm and including a first end face and second end face each having a radius of 50 mm. | | | |
| Coating layer | $P_2O_5$ content (% by mass) | 36 | — | — | — |
| | $B_2O_3$ content (% by mass) | 6 | 29 | 43 | — |
| | $Bi_2O_3$ content (% by mass) | — | — | — | 73 |
| | $Al_2O_3$ content (% by mass) | 20 | 10 | 10 | 5 |
| | $SiO_2$ content (% by mass) | — | — | 10 | — |
| | ZnO content (% by mass) | — | 14 | — | 10 |
| | RO content   CaO | 1 | 10 | 10 | 10 |
| |              BaO | — | 10 | — | — |
| | $R_2O$ content   $Li_2O$ | 5 | 5 | 5 | — |
| |              $Na_2O$ | 15 | 15 | 15 | — |
| |              $K_2O$ | 15 | 5 | 5 | — |
| | Softening point (° C.) | 405 | 570 | 565 | 520 |
| | Linear expansion coefficient ($\times 10^{-6}$/° C.) | 16 | 10 | 10 | 9 |
| | Presence or absence of particulates | Presence | Presence | Presence | Presence |
| | Type of particulates | SiC | Metal Si | Si—SiC | C |
| | Average particle diameter of particulates | 0.7 μm | 10 μm | 100 μm | 9 nm |
| Heat storage material | Type of heat storage material | CaO | CaO | CaO | CaO |
| | Particle size of heat storage material | 1 μm | 1 μm | 1 μm | 1 μm |
| Evaluation | Presence or absence of fusion of substrate | B | B | B | B |
| | Rate of temperature rise | A | A | A | A |
| | Thermal shock resistance | B | B | B | B |
| | Peeling resistance | B | B | B | B |

TABLE 4

| | | Example 15 | Example 16 | Example 17 | Example 18 | Example 19 |
|---|---|---|---|---|---|---|
| Substrate | Material | SiC | SiC | SiC | SiC | SiC |
| | SiC content (% by mass) | 99.6 | 99.6 | 99.6 | 99.6 | 99.6 |
| | Metal Si content (% by mass) | 0.2 | 0.2 | 0.2 | 0.2 | 0.2 |
| | Void ratio (%) | 34 | 34 | 34 | 34 | 34 |
| | Shape of heat storage member | A round pillar shape having an axial length of 100 mm and including a first end face and second end face each having a radius of 50 mm. | | | | |
| Coating layer | $P_2O_5$ content (% by mass) | 36 | — | — | — | — |
| | $B_2O_3$ content (% by mass) | 6 | 29 | 43 | — | 43 |
| | $B_2O_3$ content (% by mass) | — | — | — | 73 | — |
| | $Al_2O_3$ content (% by mass) | 20 | 10 | 10 | 5 | 10 |
| | $SiO_2$ content (% by mass) | — | — | 10 | — | 10 |
| | ZnO content (% by mass) | — | 14 | — | 10 | — |
| | RO content  CaO | 1 | 10 | 10 | 10 | 10 |
| | BaO | — | 10 | — | — | — |
| | $R_2O$ content  $Li_2O$ | 5 | 5 | 5 | — | 5 |
| | $Na_2O$ | 15 | 15 | 15 | — | 15 |
| | $K_2O$ | 15 | 5 | 5 | — | 5 |
| | Softening point (° C.) | 405 | 570 | 565 | 520 | 565 |
| | Linear expansion coefficient ($\times 10^{-6}$/° C.) | 16 | 10 | 10 | 9 | 10 |
| | Presence or absence of particulates | Presence | Presence | Presence | Presence | Presence |
| | Type of particulates | SiC | Metal Si | Si—SiC | C | Si—SiC |
| | Average particle diameter of particulates | 0.7 μm | 10 μm | 100 μm | 9 nm | 100 μm |
| Heat storage material | Type of heat storage material | Mg(OH)2 | MgCl2 | SrCO3 | BaSO4 | Zeolite |
| | Particle size of heat storage material | 1 μm | 1 μm | 1 μm | 1 μm | 1 μm |
| Evaluation | Presence or absence of fusion of substrate | B | B | B | B | B |
| | Rate of temperature rise | A | A | A | A | A |
| | Thermal shock resistance | B | B | B | B | B |
| | Peeling resistance | B | B | B | B | B |

TABLE 5

| | | Example 20 | Example 21 | Example 22 | Example 23 |
|---|---|---|---|---|---|
| Substrate | Material | SiC | SiC | SiC | SiC |
| | SiC content (% by mass) | 99.6 | 99.6 | 99.6 | 99.6 |
| | Metal Si content (% by mass) | 0.2 | 0.2 | 0.2 | 0.2 |
| | Void ratio (%) | 34 | 34 | 34 | 34 |
| | Shape of heat storage member | A round pillar shape having an axial length of 100 mm and including a first end face and second end face each having a radius of 50 mm. | | | |
| Coating layer | $P_2O_5$ content (% by mass) | 36 | — | — | — |
| | $B_2O_3$ content (% by mass) | 6 | 29 | 43 | — |
| | $Bi_2O_3$ content (% by mass) | — | — | — | 73 |
| | $Al_2O_3$ content (% by mass) | 20 | 10 | 10 | 5 |
| | $SiO_2$ content (% by mass) | — | — | 10 | — |
| | ZnO content (% by mass) | — | 14 | — | 10 |
| | RO content  CaO | 1 | 10 | 10 | 10 |
| | BaO | — | 10 | — | — |
| | $R_2O$ content  $Li_2O$ | 5 | 5 | 5 | — |
| | $Na_2O$ | 15 | 15 | 15 | — |
| | $K_2O$ | 15 | 5 | 5 | — |
| | Softening point (° C.) | 405 | 570 | 565 | 520 |
| | Linear expansion coefficient ($\times 10^{-6}$/° C.) | 16 | 10 | 10 | 9 |
| | Presence or absence of particulates | Presence | Presence | Presence | Presence |
| | Type of particulates | SiC | Metal Si | Si—SiC | C |
| | Average particle diameter of particulates | 0.7 μm | 10 μm | 100 μm | 9 nm |
| Heat storage material | Type of heat storage material | CaCO3 | MgCl2 | SrCO3 | BaSO4 |
| | Particle size of heat storage material | 7 nm | 0.6 μm | 2 μm | 51 μm |

TABLE 5-continued

|  |  | Example 20 | Example 21 | Example 22 | Example 23 |
|---|---|---|---|---|---|
| Evaluation | Presence or absence of fusion of substrate | B | B | B | B |
|  | Rate of temperature rise | A | A | A | A |
|  | Thermal shock resistance | B | B | B | B |
|  | Peeling resistance | B | B | B | B |

TABLE 6

|  |  | Example 24 | Example 25 | Example 26 |
|---|---|---|---|---|
| Substrate | Material | Si—SiC | Si—SiC | Si—SiC |
|  | SiC content (% by mass) | 58 | 88 | 40 |
|  | Metal Si content (% by mass) | 40 | 9 | 58 |
|  | Void ratio (%) | 93 | 93 | 93 |
|  | Shape of heat storage member | A round pillar shape having an axial length of 100 mm and including a first end face and second end face each having a radius of 50 mm. | | |
| Coating layer | $P_2O_5$ content (% by mass) | 36 | — | — |
|  | $B_2O_3$ content (% by mass) | 6 | 29 | 43 |
|  | $Bi_2O_3$ content (% by mass) | — | — | — |
|  | $A_{l2}O_3$ content (% by mass) | 20 | 10 | 10 |
|  | $SiO_2$ content (% by mass) | — | — | 10 |
|  | ZnO content (% by mass) | — | 14 | — |
|  | RO content    CaO | 1 | 10 | 10 |
|  |                      BaO | — | 10 | — |
|  | $R_2O$ content   $Li_2O$ | 5 | 5 | 5 |
|  |                      $Na_2O$ | 15 | 15 | 15 |
|  |                      $K_2O$ | 15 | 5 | 5 |
|  | Softening point (° C.) | 405 | 570 | 565 |
|  | Linear expansion coefficient ($\times 10^{-6}$/° C.) | 16 | 10 | 10 |
|  | Presence or absence of particulates | Presence | Presence | Presence |
|  | Type of particulates | SiC | Metal Si | Si—SiC |
|  | Average particle diameter of particulates | 0.7 μm | 10 μm | 100 μm |
| Heat storage material | Type of heat storage material | CaCO3 | MgCl2 | SrCO3 |
|  | Particle size of heat storage material | 7 nm | 0.6 μm | 2 μm |
| Evaluation | Presence or absence of fusion of substrate | B | B | B |
|  | Rate of temperature rise | A | A | A |
|  | Thermal shock resistance | B | B | B |
|  | Peeling resistance | B | B | B |

TABLE 7

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Substrate | Material | 19 SiC | SiC | SiC | SiC | SiC | SiC |
|  | SiC content (% by mass) | 99.6 | 99.6 | 99.6 | 99.6 | 99.6 | 99.6 |
|  | Metal Si content (% by mass) | 0.2 | 0.2 | 0.2 | 0.2 | 0.2 | 0.2 |
|  | Void ratio (%) | 34 | 34 | 34 | 34 | 34 | 34 |
|  | Shape of heat storage member | A round pillar shape having an axial length of 100 mm and including a first end face and second end face each having a radius of 50 mm. | | | | | |
| Coating layer | $P_2O_5$ content (% by mass) | 28 | 53 | — | — | — | — |
|  | $B_2O_3$ content (% by mass) | 14 | — | 5 | 53 | — | — |
|  | $Bi_2O_3$ content (% by mass) | — | — | — | — | 58 | 93 |
|  | $A_{l2}O_3$ content (% by mass) | 20 | 9 | 23 | — | 15 | — |
|  | $SiO_2$ content (% by mass) | — | — | 15 | 10 | | |

TABLE 7-continued

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
|  | ZnO content (% by mass) | — | — | 10 | — | 10 | 5 |
| RO content | CaO | 1 | 1 | 10 | 10 | 15 | — |
|  | BaO | — | — | 10 | — | — | — |
| $R_2O$ content | $Li_2O$ | 5 | 5 | 5 | 5 | — | — |
|  | $Na_2O$ | 15 | 15 | 15 | 15 | — | — |
|  | $K_2O$ | 15 | 15 | 5 | 5 | — | — |
|  | Softening point (° C.) | 405 | 405 | 565 | 565 | 515 | 520 |
|  | Linear expansion coefficient ($\times 10^{-6}/$° C.) | 16 | 16 | 10 | 10 | 9 | 9 |
|  | Presence or absence of particulates | Presence | Absence | Absence | Absence | Absence | Absence |
|  | Type of particulates | SiC | — | — | — | — | — |
|  | Average particle diameter of particulates | 0.7 μm | — | — | — | — | — |
| Heat storage material | Type of heat storage material | CaO | CaO | CaO | CaO | CaO | CaO |
|  | Particle size of heat storage material | 1 μm | 1 μm | 1 μm | 1 μm | 1 μm | 1 μm |
| Evaluation | Presence or absence of fusion of substrate | C | C | C | C | C | C |
|  | Rate of temperature rise | A | B | B | B | B | B |
|  | Thermal shock resistance | B | B | B | B | B | B |
|  | Peeling resistance | B | B | B | B | B | B |

TABLE 8

|  |  | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|
| Substrate | Material | Si—SiC | Si—SiC | Si—SiC | Si—SiC | Si—SiC | Si—SiC |
|  | SiC content (% by mass) | 58 | 58 | 58 | 58 | 58 | 58 |
|  | Metal Si content (% by mass) | 40 | 40 | 40 | 40 | 40 | 40 |
|  | Void ratio (%) | 93 | 93 | 93 | 93 | 93 | 93 |
|  | Shape of heat storage member | A round pillar shape having an axial length of 100 mm and including a first end face and second end face each having a radius of 50 mm. | | | | | |
| Coating layer | $P_2O_5$ content (% by mass) | 28 | 53 | — | — | — | — |
|  | $B_2O_3$ content (% by mass) | 14 | — | 5 | 53 | — | — |
|  | $Bi_2O_3$ content (% by mass) | — | — | — | — | 58 | 93 |
|  | $Al_2O_3$ content (% by mass) | 20 | 9 | 23 | — | 15 | — |
|  | $SiO_2$ content (% by mass) | — | — | 15 | 10 | — | — |
|  | ZnO content (% by mass) | — | — | 10 | — | 10 | 5 |
| RO content | CaO | 1 | 1 | 10 | 10 | 15 | — |
|  | BaO | — | — | 10 | — | — | — |
| $R_2O$ content | $Li_2O$ | 5 | 5 | 5 | 5 | — | — |
|  | $Na_2O$ | 15 | 15 | 15 | 15 | — | — |
|  | $K_2O$ | 15 | 15 | 5 | 5 | — | — |
|  | Softening point (° C.) | 405 | 405 | 565 | 565 | 515 | 520 |
|  | Linear expansion coefficient ($\times 10^{-6}/$° C.) | 16 | 16 | 10 | 10 | 9 | 9 |
|  | Presence or absence of particulates | Presence | Absence | Absence | Absence | Absence | Absence |
|  | Type of particulates | SiC | — | — | — | — | — |
|  | Average particle diameter of particulates | 0.7 μm | — | — | — | — | — |
| Heat storage material | Type of heat storage material | CaO | CaO | CaO | CaO | CaO | CaO |
|  | Particle size of heat storage material | 1 μm | 1 μm | 1 μm | 1 μm | 1 μm | 1 μm |

TABLE 8-continued

|  | Comp. Ex. 7 | Comp. Ex. 8 | Comp. Ex. 9 | Comp. Ex. 10 | Comp. Ex. 11 | Comp. Ex. 12 |
|---|---|---|---|---|---|---|
| Evaluation Presence or absence of fusion of substrate | C | C | C | C | C | C |
| Rate of temperature rise | A | B | B | B | B | B |
| Thermal shock resistance | B | B | B | B | B | B |
| Peeling resistance | B | B | B | B | B | B |

TABLE 9

| | | Comp. Ex. 13 | Comp. Ex. 14 | Comp. Ex. 15 | Comp. Ex. 16 | Comp. Ex. 17 |
|---|---|---|---|---|---|---|
| Substrate | Material | SiC—$Al_2O_3$—$SiO_2$ clay | Si—SiC | Mullite | Cordierite | Nickel alloy |
| | SiC content (% by mass) | 35 | 35 | — | — | — |
| | Metal Si content (% by mass) | — | 63 | — | — | — |
| | Void ratio (%) | — | 93 | — | — | — |
| | Shape of heat storage member | A round pillar shape having an axial length of 100 mm and including a first end face and second end face each having a radius of 50 mm. | | | | |
| Coating layer | $P_2O_5$ content (% by mass) | 28 | 53 | — | — | — |
| | $B_2O_3$ content (% by mass) | 14 | — | 5 | 53 | — |
| | $Bi_2O_3$ content (% by mass) | — | — | — | — | 58 |
| | $Al_2O_3$ content (% by mass) | 20 | 9 | 23 | — | 15 |
| | $SiO_2$ content (% by mass) | — | — | 15 | 10 | — |
| | ZnO content (% by mass) | — | — | 10 | — | 10 |
| RO content | CaO | 1 | 1 | 10 | 10 | 15 |
| | BaO | — | — | 10 | — | — |
| $R_2O$ content | $Li_2O$ | 5 | 5 | 5 | 5 | — |
| | $Na_2O$ | 15 | 15 | 15 | 15 | — |
| | $K_2O$ | 15 | 15 | 5 | 5 | — |
| | Softening point (° C.) | 405 | 405 | 565 | 565 | 515 |
| | Linear expansion coefficient ($\times 10^{-6}$/° C.) | 16 | 16 | 10 | 10 | 9 |
| | Presence or absence of particulates | Presence | Absence | Absence | Absence | Absence |
| | Type of particulates | SiC | — | — | — | — |
| | Average particle diameter of particulates | 0.7 μm | — | — | — | — |
| Heat storage material | Type of heat storage material | CaO | CaO | CaO | CaO | CaO |
| | Particle size of heat storage material | 1 μm | 1 μm | 1 μm | 1 μm | 1 μm |
| Evaluation | Presence or absence of fusion of substrate | B | C | B | B | B |
| | Rate of temperature rise | C | B | C | C | C |
| | Thermal shock resistance | B | B | B | B | B |
| | Peeling resistance | B | B | B | B | B |

With regard to the heat storage members of Examples 2 to 26, and Comparative Examples 1 to 17, values of the "void ratio" of the substrate, the "content ratio of SiC" and the "content ratio of Si", and the like are shown in Table 1, and in Tables 3 to 9.

(Results)

In regard to the evaluation on the presence or absence of fusion of the substrate with regard to all the heat storage members in Examples 1 to 26, the results were found to be preferable. Especially, in regard to the evaluation on the rate of temperature rise with regard to the heat storage members in Examples 11 to 26, the results were found to be excellent. On the other hand, in regard to the evaluation on the presence or absence of fusion of the substrate with regard to the heat storage members in Comparative Examples 1 to 12, and 14, the results were C. Furthermore, the heat storage members of Comparative Examples 13, and 15 to 17, the results in the evaluation on the rate of temperature rise were C.

A heat storage member according to an embodiment of the present invention can be used for recovering and storing heat and for reusing the recovered and stored heat. For example, the heat storage member herein can be utilized to support heating a catalyst for disposing exhaust gas when an engine of an automobile and the like is started. Furthermore, the heat storage member herein can be utilized for a heater inside a cabin (indoor) of the automobile.

DESCRIPTION OF REFERENCE NUMERALS

1: core part (core part of skeleton), 3: surface layer part (surface layer part of skeleton), 4: skeleton part (skeleton part of urethane foam), 5: void part (void part of urethane foam), 7: Metal Si, 9: SiC slurry formed body, 10: substrate, 10a: SiC sintered body, 11: first end face, 12: second end face, 13: skeleton, 14: three-dimensional network structure, 15: void (void in three-dimensional network structure), 50: heat storage material, 51: coating layer, 52: particulate, 100: heat storage member.

What is claimed is:

1. A heat storage member comprising:
    a substrate containing a SiC sintered body as a principal ingredient;
    a coating layer disposed in a surface of the substrate; and
    a heat storage material disposed in a surface of the coating layer and configured to store and radiate heat by a reversible chemical reaction with a reaction medium, or
    a heat storage material configured to store and radiate heat by physical adsorption to a reaction medium and by physical desorption from a reaction medium;
    wherein a softening point of the coating layer is a temperature at 1000° C. or less.

2. The heat storage member according to claim 1, wherein the coating layer contains $P_2O_5$ as a principal ingredient, and a content rate of $P_2O_5$ is 20 to 45% by mass.

3. The heat storage member according to claim 1, wherein the coating layer contains $B_2O_3$ as a principal ingredient, and a content rate of $B_2O_3$ is 20 to 45% by mass.

4. The heat storage member according to claim 1, wherein the coating layer contains $Bi_2O_3$ as a principal ingredient, and a content rate of $Bi_2O_3$ is 65 to 85% by mass.

5. The heat storage member according to claim 2, wherein the coating layer contains as a secondary ingredient at least one of $Al_2O_3$, $SiO_2$, ZnO, $V_2O_5$, PbO, SnO, $B_2O_3$ and $Bi_2O_3$.

6. The heat storage member according to claim 3, wherein the coating layer contains as a secondary ingredient at least one of $Al_2O_3$, $SiO_2$, ZnO, $V_2O_5$, PbO, SnO, $P_2O_5$ and $Bi_2O_3$.

7. The heat storage member according to claim 4, wherein the coating layer contains as a secondary ingredient at least one of $Al_2O_3$, $SiO_2$, ZnO, $V_2O_5$, PbO, SnO, $P_2O_5$ and $B_2O_3$.

8. The heat storage member according to claim 2, wherein the coating layer contains as the secondary ingredient at least one of CaO, BaO, SrO represented by RO and $Li_2O$, $Na_2O$, $K_2O$ represented by $R_2O$.

9. The heat storage member according to claim 2, wherein the coating layer contains as the secondary ingredient at least one of $TeO_2$ and $TiO_2$.

10. The heat storage member according to claim 1, wherein the substrate has a content ratio of SiC ranging from 40 to 99.7% by mass, excluding an impure ingredient inevitably contained in a raw material.

11. The heat storage member according to claim 1, wherein the substrate is a porous material including a void, and the coating layer is disposed at least in a part of a surface of the void in the substrate.

12. The heat storage member according to claim 1, wherein the substrate includes a void, and has a three-dimensional network structure including a skeleton having a porosity of 1% or less, and the coating layer is disposed at least in a part of the surface of the void.

13. The heat storage member according to claim 12, wherein the skeleton includes a Si—SiC sintered body, and a content ratio of metal Si in the skeleton is ranging from 5 to 60% by mass.

14. The heat storage member according to claim 1, wherein the surface of the coating layer is disposed with protrusions having a difference between recesses and protrusions of 0.5 to 100 μm.

15. The heat storage member according to claim 14, wherein density of the protrusions with respect to a surface area of the coating layer is 1 to 1000000 protrusions/10000 μm².

16. The heat storage member according to claim 15, wherein the coating layer includes particulates dispersed in the coating layer and having an average particle diameter of 5 nm to 100 μm.

17. The heat storage member according to claim 16, wherein the particulates are at least one of SiC particles, metal Si particles, Si—SiC particles, and C particles.

18. The heat storage member according to claim 1, wherein the heat storage material includes at least one selected from the group consisting of oxides of Mg, Ca, Sr, Ba, hydroxides of Mg, Ca, Sr, Ba, carbonates of Mg, Ca, Sr, Ba, chlorides of Mg, Ca, Sr, Ba, sulfates of Mg, Ca, Sr, Ba, and zeolite.

19. The heat storage member according to claim 1, wherein the heat storage material is a particulate having an average particle diameter ranging from 5 nm to 100 μm.

* * * * *